(12) United States Patent
Sasada et al.

(10) Patent No.: US 8,393,727 B2
(45) Date of Patent: Mar. 12, 2013

(54) INK COMPOSITION, METHOD OF PRODUCING THE SAME, INK SET, AND IMAGE FORMING METHOD

(75) Inventors: Misato Sasada, Kanagawa (JP); Yasufumi Ooishi, Kanagawa (JP)

(73) Assignee: FujiFilm Corporation, Tokyo (JP)

( * ) Notice: Subject to any disclaimer, the term of this patent is extended or adjusted under 35 U.S.C. 154(b) by 100 days.

(21) Appl. No.: 13/079,820

(22) Filed: Apr. 5, 2011

(65) Prior Publication Data

US 2011/0249055 A1    Oct. 13, 2011

(30) Foreign Application Priority Data

Apr. 9, 2010  (JP) ................................. 2010-090582
Apr. 1, 2011  (JP) ................................. 2011-082239

(51) Int. Cl.
*G01D 11/00* (2006.01)

(52) U.S. Cl. ...................................................... 347/100

(58) Field of Classification Search .................... 347/20, 347/95, 100; 106/31.86; 524/88, 317
See application file for complete search history.

(56) References Cited

U.S. PATENT DOCUMENTS 7,307,109 B2 * 12/2007 Yatake et al. ................. 523/160

FOREIGN PATENT DOCUMENTS

JP    3642152 B2    4/2005
JP    2009-190379 A  8/2009

* cited by examiner

*Primary Examiner* — An Do
(74) *Attorney, Agent, or Firm* — Solaris Intellecutal Property Group, PLLC

(57) ABSTRACT

The present invention provides an inkjet ink composition, which has excellent ink-ejection reliability over a long time and capability of forming an image without defects such as white spots, and which includes: a pigment coated with a dispersant polymer; a water soluble polymerizable compound; a polymerization initiator; and water, the dispersant polymer being formed from a water soluble dispersant by crosslinking with a crosslinking agent.

14 Claims, 1 Drawing Sheet

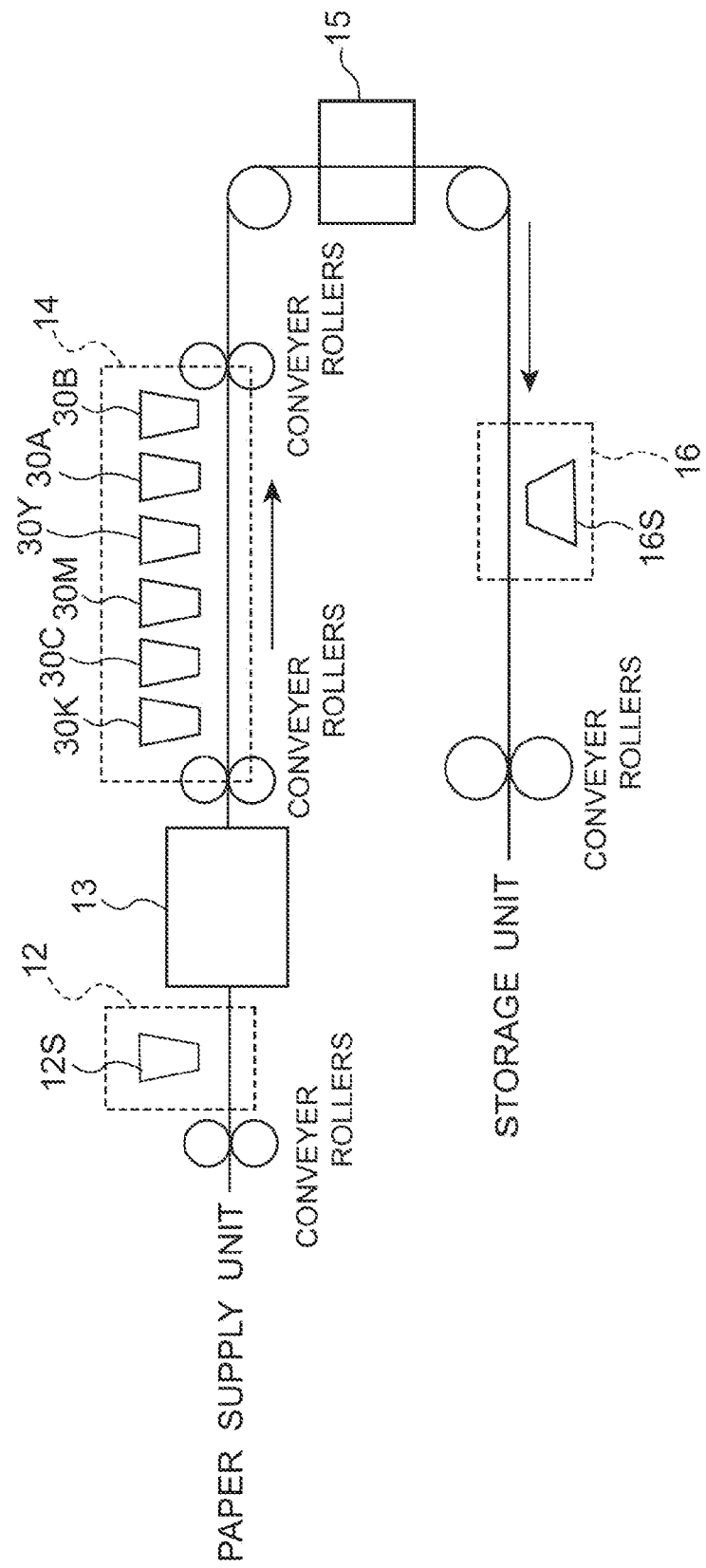

INK COMPOSITION, METHOD OF PRODUCING THE SAME, INK SET, AND IMAGE FORMING METHOD

CROSS-REFERENCE TO RELATED APPLICATION

This application claims priority under 35 USC 119 from Japanese Patent Application Nos. 2010-090582, filed on Apr. 9, 2010, and 2011-082239, filed on Apr. 1, 2011, the disclosures of which are incorporated by reference herein.

BACKGROUND OF THE INVENTION

1. Field of the Invention

The present invention relates to an ink composition and a method of producing the ink composition, an ink set, and a method of forming an image.

2. Description of the Related Art

In recent years, with advancement of inkjet recording technology, an inkjet recording process has come to be used for high precision images for photography and off-set printing, whereby high-quality recording is demanded.

To meet the above demand, as a technology that improves liquid stability and ink-ejection performance, an ink set that includes therein an ink composition and a colorless ink composition has been disclosed (for instance, see Japanese Patent Application Laid-Open (JP-A) No. 2009-190379). The ink composition contains a polymer-coated pigment, resin fine particles and a water soluble dispersant. The colorless ink composition contains a flocculation promoter that accelerates flocculation of the ink composition.

Further, for the purpose of attaining high-quality printing that prevents ink bleeding and uneven printing and assures excellent coloring, a modified inkjet recording process has been disclosed, in which a reaction liquid that contains a photo-polymerization initiator and an ink composition that contains acrylate monomers and oligomers are applied onto a recording medium, and the recording medium is irradiated with UV-light and/or heated during or after recording (for instance, see Japanese Patent No. 3642152).

SUMMARY OF THE INVENTION

According to an aspect of the invention, an inkjet ink composition, which has excellent ink-ejection reliability over a long time and capability of forming an image without defects such as white spots, and which includes: a pigment coated with a dispersant polymer; a water soluble polymerizable compound; a polymerization initiator; and water, the dispersant polymer being formed from a water soluble dispersant by crosslinking with a crosslinking agent, an ink set including the inkjet ink composition and a specific treatment liquid, an image forming method using the ink set, and a method for producing the inkjet ink composition, are provided.

Problems to be Addressed by the Invention

In the method described in JP-A No. 2009-190379 in which fine resin particles are incorporated and fixed at a temperature higher than the softening point thereof, the polymer or resin fine particles incorporated therein serve as a binder and improve fixing properties and water resistance recognizably. However, the fixing properties depend on the thermal properties of the polymer, whereby sufficient fixing properties are not attained in some cases, particularly when recording is performed at high-speed.

Such failure in fixing properties depends on differences in printing paper properties. For instance, general purpose printing paper, which is used for conventional offset printing or the like and is inferior to plain paper in liquid penetration property, has difficulties in fact in high-speed and high-quality image recording, because pigment remains on the surface to a greater degree.

In the process disclosed in Japanese Patent No. 3642152, the ink composition does not have sufficient stability; ink-ejection reliability becomes insufficient with time; and performance (namely, maintenance performance) for removing aggregates of liquid mixtures that are deposited and dried around inkjet heads is not sufficient. Namely, in the case of recording images, mist is generated when ink drops are ejected; and aggregates are formed by mixing of a number of liquids around the heads, whereby a failure in ink-ejection directionality is caused by the aggregates, which are hardly removed by ejection of fresh liquid. As a result, defects such as white spots occur in recorded images.

The present invention has been accomplished in view of the above circumstances, and it is an object of the present invention to provide an ink composition that includes as components thereof a polymerizable compound and a pigment dispersion and a method of producing the ink composition, wherein the ink composition provides excellent ink-ejection stability over a long time and has a capability of forming an image without defects such as white spots. The present invention has been made to achieve the above object.

It is another object of the prevent invention to provide an ink set capable of forming an excellent image free of defects such as white spots and a method of forming an image. The present invention has also been made to achieve this object.

The term "maintenance" according to the invention includes maintaining the inkjet head that ejects an ink composition for inkjet recording, and its jetting performance, to be in an anticipated state or a state close thereto, and sustaining the state (maintenance), as well as washing the recording head (cleaning), and repairing and maintaining the head in a better state. The maintenance liquid also includes a washing liquid for washing out an ink composition.

Solution to Problem

Exemplary embodiments according to the aspect of the invention include, but are not limited to the following items <1> to <15>.

<1> An inkjet ink composition including: a pigment coated with a dispersant polymer; a water soluble polymerizable compound; a polymerization initiator; and water, the dispersant polymer being formed from a water soluble dispersant by crosslinking with a crosslinking agent.

<2> The inkjet ink composition according to the item <1>, wherein the polymerization initiator is a photopolymerization initiator.

<3> The inkjet ink composition according to the item <1> or the item <2>, wherein the water soluble dispersant includes a carboxylic group.

<4> The inkjet ink composition according to any one of the items <1> to <3>, wherein an acid value of the water soluble dispersant is in a range from 135 mgKOH/g to 200 mgKOH/g.

<5> The inkjet ink composition according to any one of the items <1> to <4>, wherein the water soluble polymerizable compound includes at least two polymerizable functional groups selected from the group consisting of a (meth)acrylamido group, a maleamido group, a vinylsulfono group and a N-vinylamido group, and has a ratio of a molecular weight of the water soluble polymerizable compound to a number of the polymerizable functional groups in a molecule (molecular weight/number of the polymerizable functional groups) of 175 or less.

<6> The inkjet ink composition according to the item <5>, wherein at least one of the polymerizable functional groups is a (meth)acrylamido group.

<7> The inkjet ink composition according to the item <5>, wherein the water soluble polymerizable compound includes at least two (meth)acrylamido groups and at least one non-ionic hydrophilic group selected from the group consisting of an oxyalkylene group, an oligomer of the oxyalkylene group and a hydroxyl group, and the ratio of the molecular weight to the number of the polymerizable functional groups is from 84 to 165.

<8> The inkjet ink composition according to any one of the items <1> to <7>, wherein an amount of the water soluble dispersant is in a range from 10% by mass to 200% by mass with respect to a total mass of the pigment.

<9> The inkjet ink composition according to any one of the items <1> to <8>, wherein the crosslinking agent includes a compound having two or more epoxy groups.

<10> An ink set including: the ink composition according to any one of the items <1> to <9>; and treatment liquid including a coagulant that is adapted to coagulate at least a part of the components in the ink composition.

<11> The ink set according to the item <10>, wherein the coagulant includes at least one selected from the group consisting of an acidic compound, a polyvalent metal salt, and a cationic polymer.

<12> The ink set according to the item <10>, wherein the coagulant includes a dibasic or higher-basic water soluble organic acid.

<13> The ink set according to any one of the items <10> to <12>, wherein a pH (at 25° C.) of the ink composition is 8 or higher, and a pH (at 25° C.) of the treatment liquid is in a range from 0.5 to 4.

<14> An image forming method including: imparting the inkjet ink composition in the ink set according to any one of the items <10> to <13> onto a recording medium by an inkjet process, and imparting the treatment liquid in the ink set according to any one of the items <10> to <13> onto a recording medium, thereby forming an image.

<15> A method of producing an ink composition, including: preparing a pigment dispersion by dispersing a pigment with a water soluble dispersant; crosslinking the water soluble dispersant with a crosslinking agent after preparing the pigment dispersion so as to coat the surface of the pigment with a resulting crosslinked dispersing polymer; and preparing an ink composition through mixing the pigment dispersion, a water soluble polymerizable compound, a polymerization initiator, and water.

BRIEF DESCRIPTION OF THE DRAWINGS

Exemplary embodiments of the present invention will be described in detail based on the following FIGURE, wherein:

FIG. 1 is a diagram schematically illustrating the configuration of an inkjet recording apparatus used for an image forming method according to an exemplary embodiment of the invention.

DETAILED DESCRIPTION OF THE INVENTION

Hereinafter, the ink composition of the present invention and the method of producing the ink composition, the ink set, and the method of forming an image are described in detail.

Ink Composition

The ink composition of the present invention includes as components thereof a pigment that is coated with a dispersing polymer, a water soluble polymerizable compound, a polymerization initiator, and water. The dispersing polymer is a water soluble dispersant that is crosslinked with a crosslinking agent. If necessary, the ink composition may further include therein a dispersant or a surfactant, or the other components.

The polymerizable compound and the pigment dispersion allow the ink composition of the present invention to be provided with excellent dispersion stability over a long time. As a result, an excellent ink ejection reliability is attained when the ink composition is ejected in an inkjet process. In addition, an image that is formed from the ink composition of the present invention is free from defects such as white spots.

As opposed to this, conventional water-borne pigment inks or conventional water-borne UV (ultraviolet) inks that contain a polymerizable compound have not sufficient stability. In particular, the water-borne UV inks hardly have satisfactory stability with time.

On the other hand, the ink composition of the present invention is prescribed in a specific manner that a pigment is coated with a dispersing polymer whose water soluble dispersant is crosslinked with a crosslinking agent is used as a colorant, so that the ink composition is considered to exhibit excellent advantages in accordance with the following mechanism.

Namely, the dispersing polymer is prevented from being separated with time, so that excellent stability is considered to be attained.

Pigment

The ink composition of the present invention includes therein as a component at least one pigment (hereinafter, also referred to as "water-dispersing pigment") that is coated with a dispersing polymer whose water soluble dispersant is crosslinked with a crosslinking agent.

Examples of the water soluble dispersant includes: polyvinyls; polyurethanes; and polyesters. Among these, polyvinyls are preferable.

The water soluble dispersant includes in the molecule thereof a group which is crosslinkable with a crosslinking agent. The group which is crosslinkable is not particularly limited. Examples of the group include: a carboxy group or a salt thereof; an isocyanate group; and an epoxy group. A carboxy group(s) or a salt thereof is preferably included from the viewpoint of improving dispersibility.

In a preferred method of synthesizing the water soluble dispersant, the water soluble dispersant is obtained in a form of a copolymer that is synthesized by using a carboxy group containing monomer as a copolymerization component. Examples of the carboxy group containing monomer include: methacrylic acid; β-carboxyethyl acrylate; fumaric acid; itaconic acid; maleic acid; and crotonic acid. Among these, methacrylic acid or β-carboxyethyl acrylate is preferable from the viewpoint of crosslinking performance and dispersion stability.

In the present invention, the acid value of the water soluble dispersant (amount of KOH in mg required to neutralize 1 g of the water soluble dispersant) is preferably from 135 mgKOH/g to 250 mgKOH/g, more preferably from 135 mgKOH/g to 200 mgKOH/g, and particularly preferably from 135 mgKOH/g to 180 mgKOH/g, from the viewpoints of pigment dispersability and dispersion stability.

The weight average molecular weight of the water soluble dispersant is preferably from 3,000 to 100,000, more preferably from 5,000 to 50,000, further preferably from 5,000 to 40,000, and yet further preferably from 10,000 to 40,000.

In addition to the above components, hydrophilic monomers or hydrophobic monomers may be used as the copolymerization component. The hydrophilic monomers may be either ionic or nonionic. The hydrophobic monomers are not particularly limited. Preferable examples of the hydrophobic monomers include an alkyl methacrylate having from 1 to 20 carbon atoms, an alkyl acrylate having from 1 to 20 carbon atoms, and the like. The polymer that serves as the water soluble dispersant may be a random, blocked, or grafted polymer.

A method of synthesizing the polymer that serves as the water soluble dispersant is not particularly limited. Random polymerization of vinyl monomers is preferable from the viewpoint of dispersion stability.

An amount of the water soluble dispersant used in the present invention is preferably from 10% by mass to 200% by mass, more preferably from 20% by mass to 150% by mass, and particularly preferably from 30% by mass to 100% by mass with respect to a mass of the pigment.

The crosslinking agent is preferably a compound that has at least two cites capable of reacting with the water soluble dispersant. In particular, a compound that has at least two epoxy portions (an epoxy compound of two or more functional) is preferable because the compound has an excellent reactivity with a carboxy group.

Specific examples of the compound include: ethylene glycol diglycidyl ether; polyethylene glycol diglycidyl ether; 1,6-hexanediol diglycidyl ether; diethylene glycol diglycidyl ether; polyethylene glycol diglycidyl ether; dipropylene glycol diglycidyl ether; and polypropylene glycol diglycidyl ether. Among them, polyethylene glycol diglycidyl ether or diethylene glycol diglycidyl ether is preferable as the crosslinking agent.

The mole ratio of the crosslinking cites of the crosslinking agent to the cites of the dispersant to be crosslinked is preferably from 1:1.1 to 1:10, more preferably from 1:1.1 to 1:5, and most preferably from 1:1.1 to 1:3, from the viewpoints of crosslinking speed and stability of dispersion liquid after crosslinked.

In a preferred method of preparing the water-dispersing pigment in the present invention, crosslinking with the crosslinking agent is performed after the pigment is dispersed with the help of the water soluble dispersant. An example of the method of preparing the water-dispersing pigment is described below. However, the present invention is not limited thereto.

(1) A step of obtaining a pigment dispersion liquid, in which a pigment and a water soluble dispersant are dispersed in water or an aqueous solution of a polar solvent (pigment dispersing step).

(2) A step of obtaining a pigment (water-dispersing pigment) coated with a polymer, in which a crosslinking agent is added to the dispersion liquid obtained in (1) and the dispersion liquid is heated so that a crosslinking reaction be performed (crosslinking step).

(3) A step of purifying the above obtained water-dispersing pigment after crosslinked (pigment purifying step).

Through the above steps of (1) to (3), the water soluble pigment may be prepared.

In addition to the above steps, the other known steps may be appropriately performed when needed. As the polar solvent or the like that is used in the above steps or the other steps, a known solvent may be used appropriately.

A pigment that is used for the water-dispersing pigment in the present invention is not particularly limited. The pigment may be selected appropriately in accordance with purposes. For example, either one of an organic pigment and an inorganic pigment may be used.

Examples of the organic pigment include azo pigments, polycyclic pigments, dye chelates, nitro pigments, nitroso pigments, and aniline black. Among them, azo pigments and polycyclic pigments are more preferable. Examples of the azo pigments include azo lakes, insoluble azo pigments, condensed azo pigments, and chelate azo pigments. Examples of the polycyclic pigment include phthalocyanine pigments, perylene pigments, perinone pigments, anthraquinone pigments, quinacridone pigments, dioxazine pigments, indigo pigments, thio indigo pigments, isoindolinone pigments, and quinophthalone pigments. Examples of the dye chelates include basic dye chelates and acidic dye chelates.

Examples of the inorganic pigment include titanium oxide, iron oxide, calcium carbonate, barium sulfate, aluminium hydroxide, barium yellow, cadmium red, chrome yellow, and carbon black. Among them, carbon black is particularly preferable. The carbon black may be produced by a known method such as a contact method, a furnace method, or a thermal method.

Specific examples of carbon black include, but not limited to, RAVEN 7000, RAVEN 5750, RAVEN 5250, RAVEN 5000 ULTRA II, RAVEN 3500, RAVEN 2000, RAVEN 1500, RAVEN 1250, RAVEN 1200, RAVEN 1190 ULTRA II, RAVEN 1170, RAVEN 1255, RAVEN 1080, RAVEN 1060, and RAVEN 700 (manufactured by Columbian Carbon Company), REGAL 400R, REGAL 330R, REGAL 660R, MOGUL L, Black Pearls L, MONARCH 700, MONARCH 800, MONARCH 880, MONARCH 900, MONARCH 1000, MONARCH 1100, MONARCH 1300, and MONARCH 1400 (manufactured by Cabot Corporation), COLOR BLACK FW1, COLOR BLACK FW2, COLOR BLACK FW2V, COLOR BLACK 18, COLOR BLACK FW200, COLOR BLACK S150, COLOR BLACK S160, COLOR BLACK S170, PRINTEX 35, PRINTEX U, PRINTEX V, PRINTEX 140U, PRINTEX 140V, SPECIAL BLACK 6, SPECIAL BLACK 5, SPECIAL BLACK 4A, and SPECIAL BLACK 4 (manufactured by Degussa), No. 25, No. 33, No. 40, No. 45, No. 47, No. 52, No. 900, No. 2200B, No. 2300, MCF-88, MA600, MA7, MA8, and MA100 (manufactured by Mitsubishi Chemical Corporation).

Of the organic pigment which may be used in the invention, examples of yellow ink pigments include C. I. Pigment Yellow 1, 2, 3, 4, 5, 6, 7, 10, 11, 12, 13, 14, 14C, 16, 17, 24, 34, 35, 37, 42, 53, 55, 65, 73, 74, 75, 81, 83, 93, 95, 97, 98, 100, 101, 104, 108, 109, 110, 114, 117, 120, 128, 129, 138, 150, 151, 153, 154, 155, and 180.

Examples of magenta ink pigments include C. I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 48(Ca), 48(Mn), 48:2, 48:3, 48:4, 49, 49:1, 50, 51, 52, 52:2, 53:1, 53, 55, 57(Ca), 57:1, 60, 60:1, 63:1, 63:2, 64, 64:1, 81, 83, 87, 88, 89, 90, 101 (red oxide), 104, 105, 106, 108 (cadmium red), 112, 114, 122 (quinacridone magenta), 123, 146, 149, 163, 166, 168, 170, 172, 177, 178, 179, 184, 185, 190, 193, 202, 209, 219, 269, and C. I. Pigment Violet 19. Among them, C. I. Pigment Red 122 is particularly preferable.

Examples of cyan ink pigments include C. I. Pigment Blue 1, 2, 3, 15, 15:1, 15:2, 15:3, 15:34, 16, 17:1, 22, 25, 56, 60, C. I. Vat Blue 4, 60, and 63. Among them, C.I. Pigment Blue 15:3 is particularly preferable.

These pigments may be used alone or in combination of two or more thereof selected from one or more product groups described above.

From the viewpoints of ink coloring properties, granularity of dispersed pigment particles, ink storage stability, and discharge reliability of ink, the content of the pigment in the ink composition is preferably from 0.1 to 15% by mass, and more preferably from 0.5 to 12% by mass, and particularly preferably from 1 to 10% by mass with respect to the total mass of the ink composition.

An ink composition in the present invention includes as a component thereof at least one water soluble polymerizable compound. Particularly, a water soluble polymerizable compound that is capable of being polymerized by an application of an actinic energy ray is preferably included. The polymerizable compound is used together with the pigment. When the polymerizable compound contacts to a treatment liquid and aggregates, it is incorporated into particles and strengthens an image after polymerized and cured.

Water Soluble Polymerizable Compound

The ink composition of the present invention includes as a component thereof at least one water soluble polymerizable compound that has at least one polymerizable functional group. The ink composition is polymerized by irradiation of an actinic energy ray.

Note that, the term of "water soluble" used herein means that the polymerizable compound is dissolved in distilled water at 25° C. in an amount of 2% by mass or more, preferably 5% by mass or more, more preferably 10% by mass or more, still more preferably 20% by mass or more, and particularly preferably in a manner that the polymerizable compound is uniformly mixed with water at an arbitrary ratio.

The polymerizable functional group is not particularly limited as long as it is a functional group that polymerizes with an actinic energy ray. Examples of the polymerizable functional group may include: a vinyl group; an allyl group; a (meth)acryl group; and a derivative of these groups. Among them, the polymerizable functional group is preferably at least one selected from the group consisting of a (meth)acryl ester group, a (meth)acrylamido group, a maleimido group, a vinylsulfono group, and an N-vinylamido group, and more preferably a (meth)acrylamido group.

Note that, the term "(meth)acryl" denotes either or both of "acryl" and "methacryl."

The number of the polymerizable functional group contained in the water soluble polymerizable compound is not specifically limited. However, from the viewpoints of adhesion and blocking resistance of an image to be formed, the number of the polymerizable functional group is preferably 2 or more, more preferably 2 to 6, and even more preferably 2 to 3.

When the water soluble polymerizable compound has at least two polymerizable functional groups, they may be the same or different to each other.

From the view points of curing sensitivity and blocking resistance, according to the invention it is preferable to have at least two polymerizable functional groups selected from a group consisting of a (meth)acrylamido group, a maleimido group and a vinylsulfono group. More preferably, it has at least one (meth)acrylamido group and even more preferably it has at least two (meth)acrylamido groups.

The water soluble polymerizable compound preferably has at least one hydrophilic group in addition to the polymerizable functional group. As a hydrophilic group, any one of a nonionic group, an anionic group and a cationic group is available. Further, betaine is also available.

Specific examples of the water soluble polymerizable functional group include an oxyalkylene group and its oligomer, a hydroxyl group, an amido group, a sugar alcohol residue, a urea group, an imino group, an amino group, a carboxyl group, a sulfonic acid group, a phosphoric acid group, a thiol group and a quaternary ammonium group.

According to the invention, from the view points of image adhesion, curing sensitivity and blocking resistance, the hydrophilic group is preferably selected from an oxyalkylene group and its oligomer, a hydroxyl group, an amido group, a sugar alcohol residue, an urea group, an imino group, an amino group, a carboxyl group, a sulfonic acid group, a phosphoric acid group and a thiol group. More preferably, it is at least one selected from an oxyalkylene group and its oligomer and a hydroxyl group. Even more preferably, it is at least one selected from an oxyethylene group, an oxypropylene group and their oligomers (n=1 to 2) and a hydroxyl group.

When the water soluble polymerizable compound described above has at least two polymerizable functional groups and also contains a hydrophilic group, bonding pattern between the polymerizable functional group and the hydrophilic group is not specifically limited. However, from the view points of curing sensitivity and blocking resistance, it is preferable to have a pattern in which at least two polymerizable functional groups are bonded via an at least divalent hydrophilic group.

The examples of the at least divalent hydrophilic group include a residue of a compound selected from the following compound group from which at least two of hydrogen atom and/or hydroxyl group are removed.

—Compound Group—

Polyols such as ethylene glycol, diethylene glycol, triethylene glycol, polyethylene glycol, propylene glycol, dipropylene glycol, tripropylene glycol, polypropylene glycol, 1,3-propane diol, 1,2-butanediol, 1,3-butanediol, 1,4-butanediol, 2,3-butanediol, 1,5-pentanediol, 1,4-pentanediol, 2,4-pentanediol, 3-methyl-1,5-pentanediol, 2-methyl-2,4-pentanediol, 1,5-hexanediol, 1,6-hexanediol, 2,5-hexanediol, glycerin, 1,2,4-butane triol, 1,2,6-hexane triol, 1,2,5-pentane triol, thioglycol, trimethylol propane, ditrimethylol propane, trimethylol ethane, ditrimethylol ethane, neopentyl glycol, pentaerythritol, dipentaerythritol and their condensates, low molecular polyvinyl alcohol, or sugars.

Polyamines such as ethylenediamine, diethylenetridiamine, triethylenetetramine, polyethyleneimine and polypropylenediamine.

Saturated or unsaturated heterocycles such as pyridine, imidazole, pyrazine, piperidine, piperazine and morpholine.

Further, from the viewpoints of the curing sensitivity and blocking resistance of an image to be formed, the water soluble polymerizable compound of the invention has the ratio of the molecular weight compared to the number of the polymerizable functional groups contained in the water soluble polymerizable compound, i.e., the value obtained by dividing the molecular weight of the water soluble polymerizable compound by the number of the polymerizable functional groups contained per single molecule (molecular weight of the polymerizable compound/number of the polymerizable functional groups contained, herein below, it may be referred to as "A value"), is preferably 175 or less, and more preferably 165 or less. Further, from the view point of the chemical structure, the A value is preferably 84 or more.

According to the invention, from the view point of the curing sensitivity and blocking resistance, it is preferable that the water soluble polymerizable compound has at least two polymerizable functional groups selected from a group consisting of a (meth)acrylamide group, a maleimide group, a vinylsulfone group and a N-vinylamide group, and has the A value of 84 to 175. It is more preferable that it has at least two polymerizable functional groups selected from a group consisting of a (meth)acrylamide group, a maleimide group, a vinylsulfone group and a N-vinylamide group, and has the A value of 84 to 165. More particularly, it is a compound having at least two (meth)acrylamide groups and the A value of 84 to 165.

Further, it is preferable that the water soluble polymerizable compound described above has at least two polymerizable functional groups selected from a group consisting of a (meth)acrylamide group, a maleimide group, a vinylsulfone group and a N-vinylamide group and a nonionic hydrophilic group, and has the A value of 84 to 175. It is more preferable that it has at least two polymerizable functional groups selected from a group consisting of a (meth)acrylamide group, a maleimide group, a vinylsulfone group and a N-vinylamide group, at least one nonionic hydrophilic group selected from an oxyalkylene group, its oligomer and a hydroxyl group, and has the A value of 84 to 165. It is particularly more preferable that it has at least two (meth)acrylamide groups, at least one nonionic hydrophilic group selected from an oxyalkylene group, its oligomer and a hydroxyl group, and has the A value of 84 to 165.

Herein below, specific examples of the water soluble polymerizable compound of the invention are described, but the invention is not limited thereto.

Polymerizable compound 1

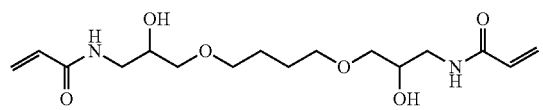

Polymerizable compound 2

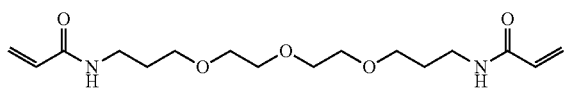

Polymerizable compound 3

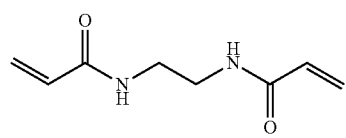

Polymerizable compound 4

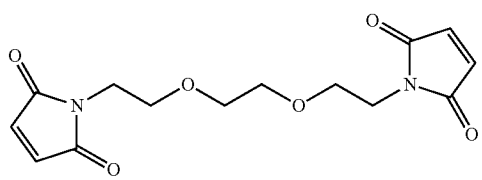

Polymerizable compound 5

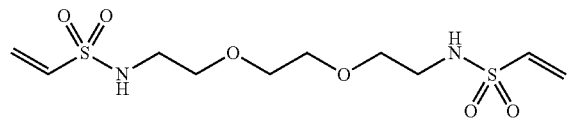

Polymerizable compound 6

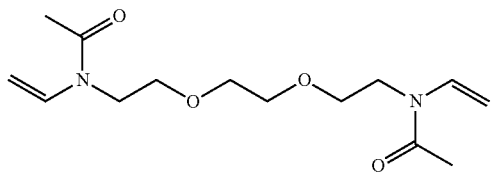

Polymerizable compound 7

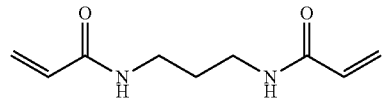

Polymerizable compound 8

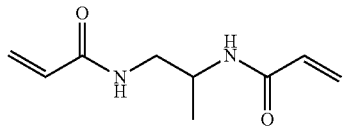

Polymerizable compound 9

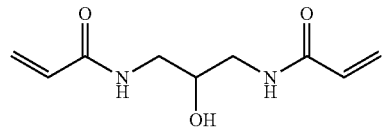

Polymerizable compound 10

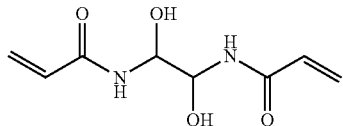

Polymerizable compound 11

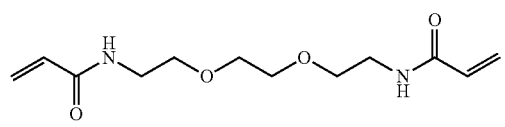

Polymerizable compound 12

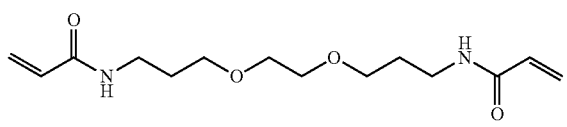

Polymerizable compound 13

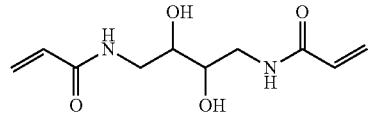

Polymerizable compound 14

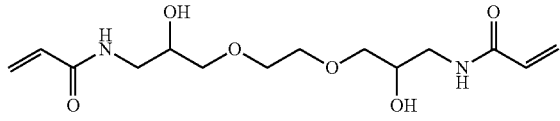

-continued
Polymerizable compound 15
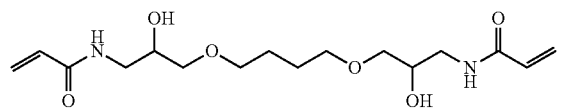
Polymerizable compound 16
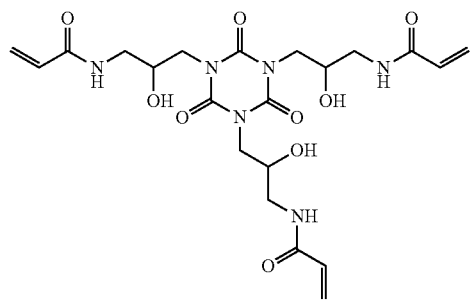
Polymerizable compound 17
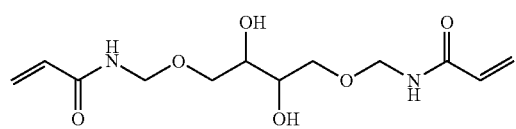
Polymerizable compound 18
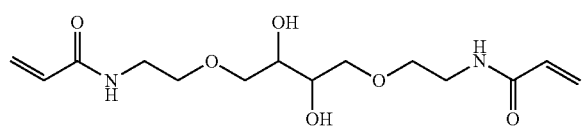
Polymerizable compound 19
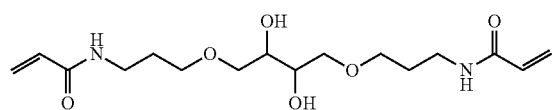
Polymerizable compound 20
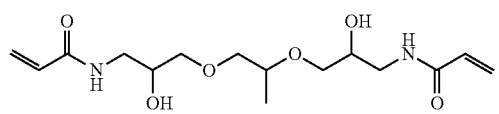
Polymerizable compound 21
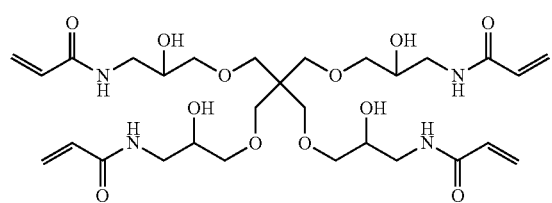
Polymerizable compound 22
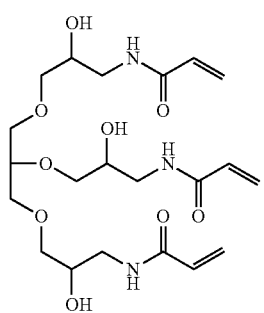
Polymerizable compound 23
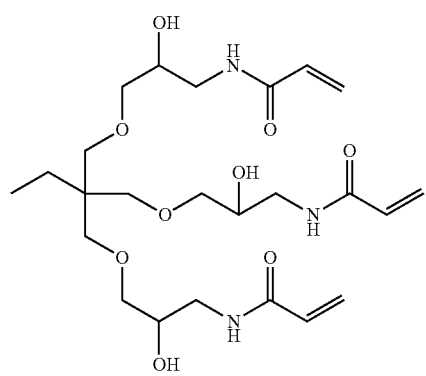
Polymerizable compound 24
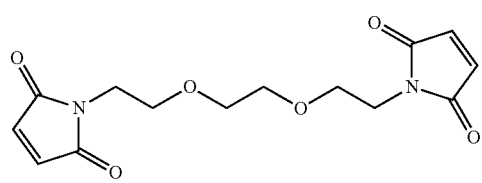
Polymerizable compound 25
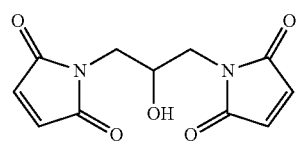
Polymerizable compound 26
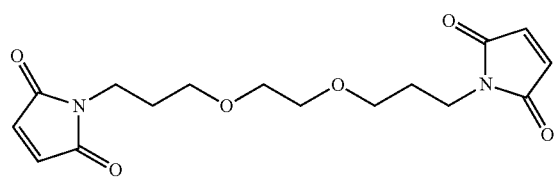

-continued
Polymerizable compound 27
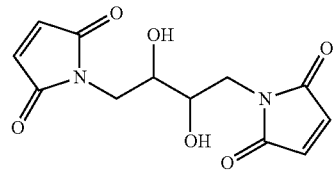
Polymerizable compound 28
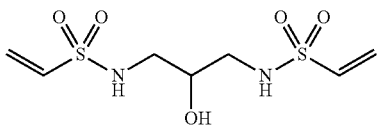
Polymerizable compound 29
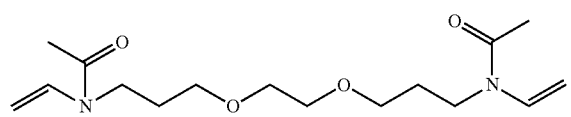
Polymerizable compound 30
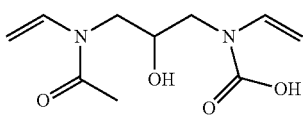
Polymerizable compound 31
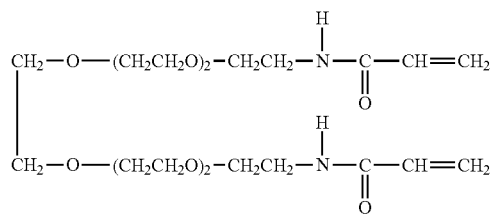
Polymerizable compound 32
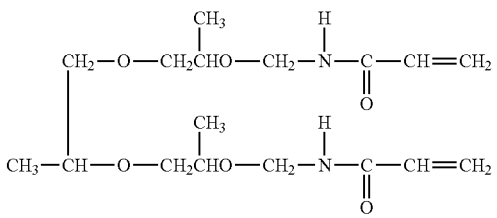
Polymerizable compound 33
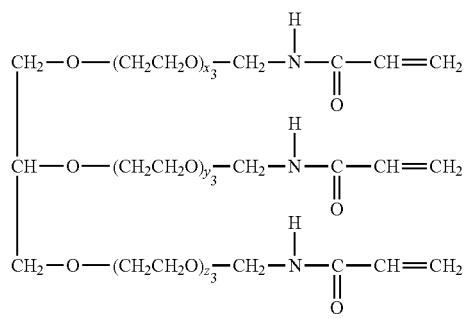
$x_3 + y_3 + z_3 = 6$
Polymerizable compound 34
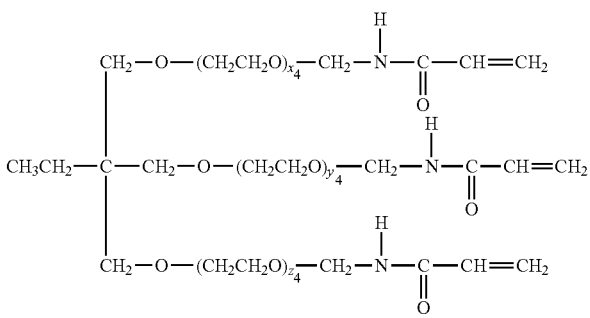
$x_4 + y_4 + z_4 = 9$
Polymerizable compound 35
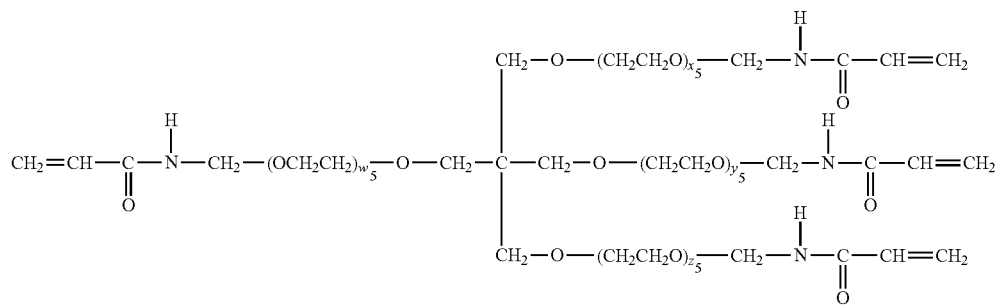
$w_5 + x_5 + y_5 + z_5 = 6$ Polymerizable compound 36
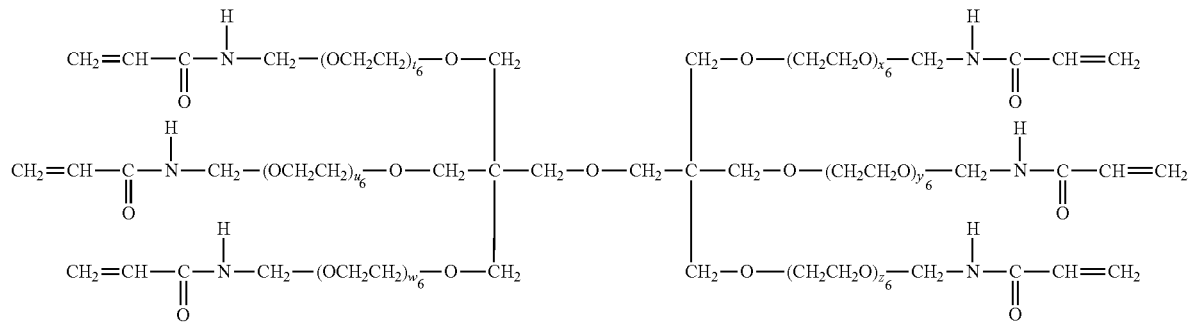
$t_6 + u_6 + w_6 + x_6 + y_6 + z_6 = 12$
Polymerizable compound 37
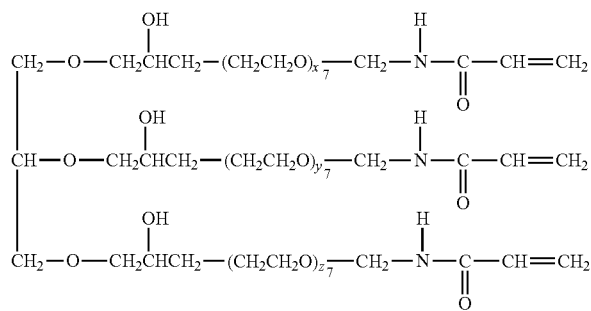
$x_7 + y_7 + z_7 = 3$
Polymerizable compound 38
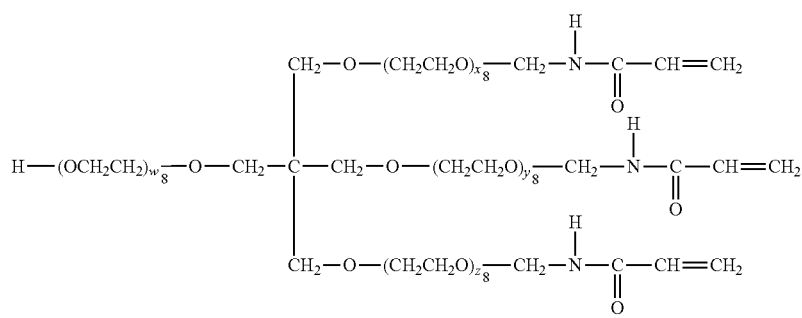
$w_8 + x_8 + y_8 + z_8 = 6$
Polymerizable compound 39
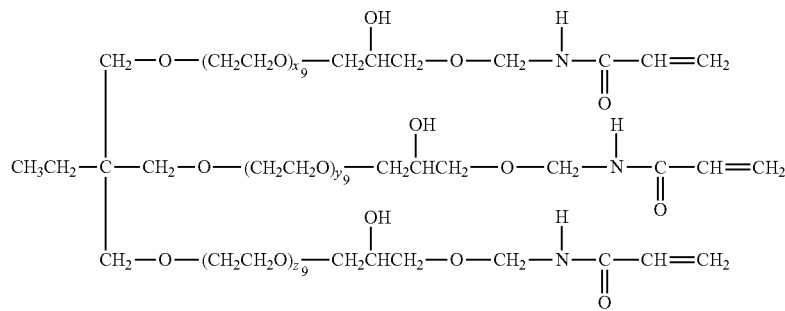
$x_9 + y_9 + z_9 = 3$ As for the water soluble polymerizable compound of the invention, the following water soluble polymerizable compounds may be also suitably used in addition to the water soluble polymerizable compounds described in the above.

Examples of the nonionic polymerizable monomer include a polymerizable compound like (meth)acryl monomer. Examples of the (meth)acryl monomer include a UV curing type monomer and oligomer like (meth)acrylate ester of polyhydric alcohol, (meth)acrylate ester of glycidyl ether of polyhydric alcohol, (meth)acrylate ester of polyethylene glycol, (meth)acrylate ester of ethylene oxide adduct of polyhydric alcohol and a reactant between polybasic acid anhydride and (meth)acrylate ester containing hydroxy group.

The polyhydric alcohol may have internal chain extension with an ethylene oxide chain according to addition of ethylene oxide.

Herein below, specific examples of the nonionic polymerizable compound (the nonionic polymerizable compound 1 to 6) are described. However, the invention is not limited thereto.

In order to improve scratch resistance, the polymerizable monomer in the invention is preferably a bifunctional or more functional monomer, and more preferably a bifunctional to hexafunctional monomer. In order to achieve solubility and scratch resistance, the polymerizable monomer is preferably a bifunctional to tetrafunctional monomer.

The polymerizable compound may be used alone or in combination of two or more thereof.

The content of the polymerizable monomer in the ink composition is preferably from 4 to 30% by mass, and more preferably from 10 to 22% by mass.

The content of the polymerizable monomer with reference to the solid content of the pigment is preferably pigment: polymerizable monomer=1:1 to 1:30, and more preferably 1:3 to 1:15. When the ratio of the polymerizable monomer content to the pigment content is 1 or more, the image strength is further improved and the image has high scratch resistance, and when the ratio is 30 or less, an advantageous pile height is achieved.

Nonionic compound 1

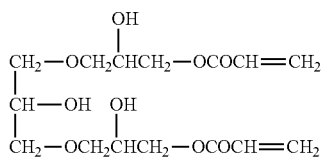

Nonionic compound 2

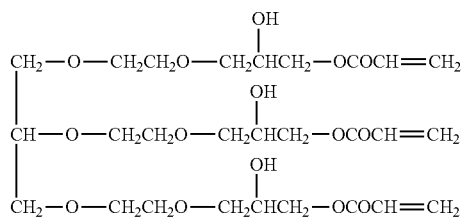

Nonionic compound 3

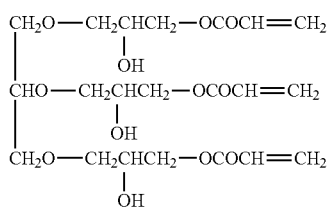

Nonionic compound 4

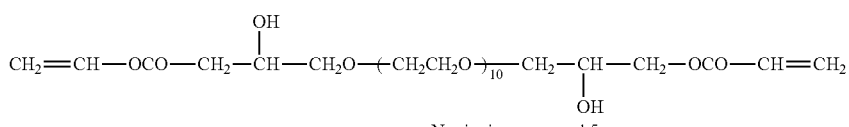

Nonionic compound 5

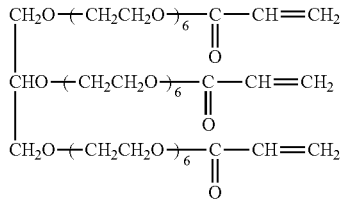

Nonionic compound 6

$$CH_2=CH-\underset{\underset{O}{\|}}{C}-O-(CH_2CH_2O)_{9}-\underset{\underset{O}{\|}}{C}-CH=CH_2$$

Further, an acrylic acid ester having at least two acryloyl groups in one molecule derived from a polyhydroxy compound may be also used. Examples of the polyhydroxy compound include a condensate of glycols, oligoether of glycols and oligoesters of glycols.

Further, suitable examples of the nonionic polymerizable compound include (meth)acrylic acid ester of polyol having at least two hydroxy groups like monosaccharides or disaccharide and; (meth)acrylic amide with triethanolamine, diethanolamine, trishydroxyaminomethane or trishydroxyaminomethane.

Initiator

The ink composition in the present invention includes therein at least one initiator (hereinafter, also referred to as polymerization initiator) that initiates polymerization of the polymerizable compound with an actinic energy ray. The initiator may be used each kind singly, as a mixture of two or more kinds, or in a combination with a sensitizer.

As the polymerization initiator, known polymerization initiators may be used without any particular limitation. As the polymerization initiator in the present invention, a photopolymerization initiator is preferably used.

Examples of a preferred photo-polymerization initiator include: (a) aromatic ketones; (b) acyl phosphine compounds; (c) aromatic onium salt compounds; (d) organic peroxides; (e) thio compounds; (f) hexa-aryl bi-imidazole compounds; (g) ketoxime ester compounds; (h) borate compounds; (i) azinium compounds; (j) methallocene compounds; (k) active ester compounds; (l) compounds having a carbon-halogen bond; and (m) alkylamine compounds.

Specific examples of the polymerization initiator may include polymerization initiators as described in page 65 to 148 of "SHIGAISEN KOKA SYSTEM" by Kiyoshi Kato (published by SOGO GIJYUTSU CENTER KK, 1989).

As the polymerization initiator in the present invention, either one may be used, a water insoluble initiator that is dispersed in water or a water soluble initiator. A water soluble polymerization initiator is preferable. Note that, the term "water soluble" used in the polymerization initiator means that the initiator is dissolved in distilled water at 25° C. in an amount of 0.5% by mass or more. The water soluble polymerization initiator is preferably dissolved in distilled water at 25° C. in an amount of 1% by mass or more and more preferably 3% by mass or more.

When the ink composition includes an initiator, the content of the initiator in the ink composition may be from 1 to 40% by mass, and more preferably from 5 to 30% by mass, with respect to the amount of the polymerizable compound. When the content of the initiator is 1% by mass or more, the rubbing resistance of an image is further improved, which is preferable in high-speed recording. A content of the initiator of 40% by mass or less is preferable in terms of jetting stability.

Examples of the sensitizer include an amine-containing compound such as an aliphatic amine, an amine having an aromatic group, or piperidine; a urea such as an allyl-containing urea or o-tolylthiourea; a sulfur-containing compound such as sodium diethyldithiophosphate or a soluble salt of an aromatic sulfinic acid; a nitrile-containing compound such as N,N-disubstituted p-aminobenzonitrile; a phosphorus-containing compound such as tri-n-butylphosphine or sodium diethyl dithiophosphate; a nitrogen-containing compound such as Michler's ketone, a N-nitrosohydroxylamine derivative, an oxazolidine compound, a tetrahydro-1,3-oxazine compound, or a condensate of a diamine with formaldehyde or acetoaldehyde; a chlorine-containing compound such as carbon tetrachloride or hexachloroethane; a high-molecular-weight amine that is a reaction product of an epoxy resin and an amine; and triethanolamine triacrylate.

The sensitizer may be contained so far as the effects of the present invention are not impaired.

Water Soluble Organic Solvent

The ink composition used in the present invention may include at least one kind of water soluble organic solvent. By including the water soluble organic solvent, effects of drying prevention, moistening, promoting penetration or the like may be obtained. In order to prevent drying, the solvent may be used as a anti-drying agent for preventing nozzle clogging due to aggregation of ink that has attached and dried at an ejection port of a jetting nozzle. In terms of drying prevention or moistening, a water soluble organic solvent having a lower vapor pressure than that of water is preferably used. In terms of promoting penetration, the solvent may be used as a penetration promoter for improving the penetration ability of ink into a recording medium.

As an anti-drying agent, the water soluble organic solvent preferably has a lower vapor pressure than that of water. Examples of such a solvent include polyhydric alcohols such as ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin and trimethylol propane; lower alkyl ethers of polyhydric alcohols, such as ethylene glycol monomethyl ether, ethylene glycol monoethyl ether, diethylene glycol monomethyl ether, diethylene glycol monoethyl ether, triethylene glycol monoethyl ether and triethylene glycol monobutyl ether; heterocyclic compounds such as 2-pyrrolidone, N-methyl-2-pyrrolidone, 1,3-dimethyl-2-imidazolidinone and N-ethyl morpholine; sulfur-containing compounds such as sulfolane, dimethyl sulfoxide and 3-sulfolene; polyfunctional compounds such as diacetone alcohol and diethanol amime; and urea derivatives.

Among these, polyhydric alcohols such as glycerin and diethylene glycol are preferable as anti-drying agents.

The anti-drying agent may be used singly or in combination of two or more thereof. The content of anti-drying agent in the ink composition is preferably from 10 to 50 mass %.

As the penetration promoter, the water soluble organic solvent is favorably used in order to promote the penetration of ink composition into a recording medium (such as printing paper). Examples of such a solvent include alcohols such as ethanol, isopropanol, butanol, diethylene glycol monobutyl ether, triethylene glycol monobutyl ether and 1,2-hexanediol, sodium lauryl sulfate, sodium oleate, and nonionic surfactants.

The penetration promoter may be used singly or in combination of two or more thereof. The content of penetration promoter in the ink composition is preferably from 5 to 30 mass %. The penetration promoter is used preferably at an amount in a range in which image bleeding or print through is not caused.

The water soluble organic solvent may be used also for adjusting the viscosity of the ink composition. Examples of the water soluble organic solvent that may be used as a viscosity adjuster include alcohols such as methanol, ethanol, propanol, isopropanol, butanol, isobutanol, sec-butanol, t-butanol, pentanol, hexanol, cyclohexanol and benzyl alcohol; polyhydric alcohols such as ethylene glycol, diethylene glycol, triethylene glycol, polyethyelene glycol, propylene glycol, dipropylene glycol, polypropylene glycol, butylene glycol, hexanediol, pentanediol, glycerin, hexanetriol and thiodiglycol; glycol derivatives such as ethylene glycol monomethyl ether, ethylene glycol monoethyl ether, ethyelene glycol monobutyl ether, diethyelene glycol monomethyl ether, diethyelene glycol monobutyl ether, propylene glycol monomethyl ether, propylene glycol monobutyl ether, dipropylene glycol monomethyl ether, triethyelene glycol monomethyl ether, ethylene glycol diacetate, ethylene glycol monomethyl ether acetate, triethylene glycol monomethyl ether, triethylene glycol monoethyl ether and ethylene glycol monophenyl ether; amines such as ethanol amine, diethanol amine, triethanol amine, N-methyl diethanol amine, N-ethyl diethanol amine, morpholine, N-ethyl morpholine, ethylene diamine, diethylene triamine, triethylene tetramine, polyethylene imine and tetramethyl propylene diamine; and other polar solvents such as formamide, N,N-dimethyl formamide, N,N-dimethyl acetoamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile and acetone. Any of these solvents may be used singly or in combination of two or more thereof.

Water

The ink composition includes water, and the content of water in the ink composition is not particularly limited. The content of water in the ink composition is preferably from 10 to 99% by mass, more preferably from 30 to 80% by mass, and still more preferably from 50 to 70% by mass.

Other Additives

The ink composition used in the present invention may further include other additives than the aforementioned components, such as known additives including an anti-drying agent (moistener), an anti-fading agent, an emulsion stabilizer, a penetration enhancing agent, a UV absorber, an antiseptic agent, an mildew-proofing agent, a pH adjuster, a surface-tension controller, an antifoam agent, a viscosity adjuster, a dispersant, a dispersion stabilizer, an antirust agent and a chelating agent. When these additives are added to the ink composition, they are usually directly added to the ink composition.

The use of the UV absorber may improve the storability of an image, and examples of the UV absorber include: benzotriazole compounds such as those described in JP-A Nos. 58-185677, 61-190537, 2-782, 5-197075 and 9-34057; benzophenone compounds such as those described in JP-A Nos. 46-2784, and 5-194483 and U.S. Pat. No. 3,214,463; cinnamic compounds such as those described in Japanese Patent Nos. 48-30492, and 56-21141 and JP-A No. 10-88106; triazine compounds such as those described in JP-A No. 4-298503, 8-53427, 8-239368, 10-182621 and Japanese Patent Application National phase Publication No. 8-501291; compounds described in Research Disclosure No. 24239; and so-called fluorescent brighteners that emit fluorescent light upon absorption of UV rays, such as stilbene compounds and benzoxazole compounds.

The anti-fading agent may be used for improving the storability of an image, and examples thereof include an organic anti-fading agent and a metal complex anti-fading agent. Examples of the organic anti-fading agent include hydroquinones, alkoxyphenols, dialkoxyphenols, phenols, anilines, amines, indanes, chromanes, alkoxyanilines and heterocyclic compounds. Examples of the metal complex anti-fading agent include nickel complexes and zinc complexes. More specifically, examples of usable antifading agents include those described in the patents cited in Research Disclosure No. 17643, Section VII, Items Ito J; Research Disclosure No. 15162; No. 18716, page 650, left column; Research Disclosure No. 36544, page 527; No. 307105, page 872; Research Disclosure No. 15162; and compounds within the scope of the chemical formulae and examples of representative compounds described in pages 127 to 137 of JP-A No. 62-215272.

Examples of the mildew-proofing agents include sodium dehydroacetate, sodium benzoate, sodium pyridinethion-1-oxide, ethyl p-hydroxybenzoate, 1,2-benzoisothiazolin-3-one, and salts thereof. The content of the mildew-proofing agent is preferably from 0.02 to 1.00 mass % with respect to the ink composition.

Examples of the pH adjuster include a neutralizer such as an organic base or an inorganic alkali. The pH adjuster may improve the storability of the ink composition. The pH adjuster is preferably added at such an amount that the pH of the ink composition becomes from 6 to 10, more preferably from 7 to 10.

Example of the surface-tension controller include nonionic surfactants, cationic surfactants, anionic surfactants, and betaine surfactants.

The surface-tension controller is preferably added in such an amount that the surface tension of the ink composition is from 20 to 60 mN/m, more preferably from 20 to 45 mN/m, and further preferably from 25 to 40 mN/m. When the surface-tension controller is added in an amount in the above range, the ink composition may be spotted in a favorable manner using an inkjet process.

Specific examples of the surfactant as a hydrocarbon type preferably include anionic surfactants such as fatty acid salts, alkyl sulfuric acid ester salts, alkyl benzenesulfonates, alkyl naphthalenesulfonates, dialkyl sulfosuccinates, alkyl phosphoric acid ester salts, naphthalenesulfonic acid-formalin condensates and polyoxyethylene alkyl sulfuric acid salts; and nonionic surfactants such as polyoxyethylene alkyl ether, polyoxyethylene alkyl allyl ether, polyoxyethylene fatty acid ester, sorbitan fatty acid ester, polyoxyethylene sorbitan fatty acid ester, polyoxyethylene alkyl amine, glycerin fatty acid ester and oxyethylene oxypropylene block copolymer. SURFYNOLS (trade name, products of Air Products & Chemicals) which are an acetylene type polyoxyethylene oxide surfactant) are preferably used. Furthermore, amine oxide type amphoteric surfactants such as N,N-dimethyl-N-alkyl amine oxide are preferred.

Additionally, materials described on pages (37) to (38) of JP-A No. 59-157636 and Research Disclosure No. 308119 (1989) as surfactants can be used.

When fluorocarbon (alkyl fluoride type) surfactants, silicone surfactants or the like, such as those described in JP-A Nos. 2003-322926, 2004-325707 and 2004-309806 are used, abrasion resistance can be improved.

The aforementioned surface-tension controller may also be used as an antifoam agent, and fluorine compounds, silicone compounds, chelate compounds such as EDTA are also applicable.

Method of Producing Ink Composition

A method of producing an ink composition of the present invention include as elementary steps thereof: a step of preparing a pigment dispersion by dispersing a pigment with a water soluble dispersant, then crosslinking the water soluble dispersant with a crosslinking agent so as to coat the surface of the pigment with a resulting crosslinked dispersing polymer; a step of preparing an ink composition through mixing the pigment dispersion, a water soluble polymerizable compound, a polymerization initiator, and water; and the other steps, when needed.

Owing to the above configuration, the present invention may provide a method of producing an ink composition that exhibits an excellent ink ejection reliability over a long time and is capable of forming an image free of defects such as white spots.

In the present invention, the step of preparing the pigment dispersion may be described substantially similar to the method of preparing the water dispersing pigment that is described in the section of the ink composition, and preferred examples may be also described similarly.

The details of the pigment, water soluble dispersant, crosslinking agent, and the others that are used in the step of preparing the pigment dispersion may be described substantially similar to those in the method of preparing the water dispersing pigment, and preferred examples may be also described similarly.

The step of preparing the ink composition in the present invention includes as a unit step thereof a step of mixing the pigment dispersion, the water soluble polymerizable compound, and water. In the mixing step, in addition to the above components, the other components that are described in the section of the ink composition may be added, when needed.

In the above step, mixing may be performed with known dispersing machines or the like.

Ink Set

The ink set in the present invention includes as components thereof the ink composition and a treatment liquid that contains a coagulant aggregating the ingredients of the ink composition.

By using the ink composition in combination with the treatment liquid, the ink set in the present invention allows high-speed inkjet recording, whereby an excellent image with picture qualities of high density and high definition (for example, high reproducibility of fine lines and fine portions of image) may be attained even when the image is recorded at high speed.

Treatment Liquid

The treatment liquid includes as a component thereof at least a coagulant that aggregates the ingredients of the ink composition. Further, the other components may be included as the component, when needed.

Examples of the coagulant include a compound that can change the pH value of the ink composition, such as an acidic compound and the like, a polyvalent metal salt, and a polymer having a quaternary amine or a tertiary amine such as polyallylamines. In the present invention, the coagulant preferably includes at least one selected from the group constituting of an acidic compound a polyvalent metal salt, and a polymer having a quaternary amine or a tertiary amine such as polyallylamines. The coagulant more preferably includes an acidic compound.

Preferable examples of the acidic compound include sulfuric acid, hydrochloric acid, nitric acid, phosphoric acid, polyacrylic acid, acetic acid, glycoric acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyrone carboxylic acid, pyrole carboxylic acid, furan carboxylic acid, pyridine carboxylic acid, coumalic acid, thiophene carboxylic acid, nicotinic acid, or derivatives of such compound or salts thereof. One of these acidic compounds may be used alone or two or more thereof may be used together.

In the present invention, when the treatment liquid includes an acidic compound, the pH value of the treatment liquid at 25° C. is preferably 6 or less, and more preferably 4 or less. In particular, the pH value of the treatment liquid at 25° C. is preferably from 1 to 4, and particularly preferably from 1 to 3. In such a case, the pH value of the ink composition at 25° C. is preferably 7.5 or more, and more preferably 8.0 or more.

In particular, it is preferable that the pH value of the ink composition at 25° C. is 8.0 or more and the pH value of the treatment liquid at 25° C. is from 0.5 to 4, from the viewpoint of image density, resolution, and higher-speed image forming.

Among them, the acidic compound is preferably an acidic compound having high solubility with respect to water, more preferably a phosphoric acid or an organic acid, even more preferably an organic acid, even more preferably a dibasic or higher-basic organic acid, and particularly preferably a divalent or trivalent acidic compound from the viewpoints of increasing coagulation properties and immobilizing the entire ink. The dibasic or higher-basic organic acid is preferably an organic acid having a first pKa of 3.5 or less, and more preferably an organic acid having a first pKa of 3.0 or less. Examples thereof include oxalic acid, malonic acid, and citric acid.

Examples of the polyvalent metal salt and a polyallyl amine include salts of alkaline earth metals belonging to group 2 of the periodic table (for example, magnesium and calcium), salts of a transition metal belonging to group 3 of the periodic table (for example, lanthanum), salts of a cation of a metal belonging to group 13 of the periodic table (for example, aluminum), salts of a lanthanide (for example, neodium). As the metal salts, carboxylic acid salts (such as, salts of formic acid, salts of acetic acid, and salts of benzoic acid), nitric acid salts, chlorides, and thiocyanic acid salts are preferred, and calcium salts or magnesium salt of a carboxylic acid (such as salts of formic acid, salts of acetic acid, and salts of benzoic acid), calcium salt of nitric acid or magnesium salt of nitric acid, calcium chloride, magnesium chloride, and calcium salt of thiocyanic acid or magnesium salt of thiocyanic acid are more preferred.

The coagulant may be used singly, or in combination of two or more thereof.

The content of the coagulant, which coagulates the ink composition, in the treatment liquid is preferably from 1 to 50% by mass, more preferably from 3 to 45% by mass, and still more preferably from 5 to 40% by mass.

The treatment liquid may include other additives as additional components, as long as the effects of the present invention are not impaired. Examples of other additives include known additives, such as an anti-drying agent (moistening agent), an anti-fading agent, an emulsion stabilizer, a penetration enhancing agent, a UV absorber, an antiseptic agent, an mildew-proofing agent, a pH adjuster, a surface-tension controller, an antifoam agent, a viscosity adjuster, a dispersant, a dispersion stabilizer, an antirust agent, and a chelating agent.

As a preferred embodiment of the ink set according to the present invention, a combination of an ink composition and a treatment liquid that contains an organic acid may be described, wherein the ink composition contains a specific water-dispersing pigment and a specific polymerizable compound. The specific water-dispersing pigment is coated with a water soluble dispersant that has a carboxy group and an acid value of 135 mgKOH/g to 250 mgKOH/g. The specific polymerizable compound has two or more polymerizable functional groups selected from the group consisting of a (meth)acrylamido group, a maleimido group, a vinylsulfono group, and an N-vinylamido group, having a ratio of the molecular weight to the number of polymerizable functional groups per molecule (molecular weight/number of polymerizable functional groups) of 175 or less.

Further, as a more preferred embodiment, a combination of an ink composition and a treatment liquid that contains a dibasic or higher-basic organic acid may be described, wherein the ink composition contains a specific water-dispersing pigment and a specific polymerizable compound. The specific water-dispersing pigment is coated with a water soluble dispersant that has a carboxy group and an acid value of 135 mgKOH/g to 250 mgKOH/g. The specific polymerizable compound is a water soluble (meth)acrylamide monomer that has at least one (meth)acrylamido group as a polymerizable functional group.

Method of Forming Image

The method of forming an image according to the present invention includes as elementary steps thereof: a step of applying an ink composition of the present invention or an ink composition of the ink set of the present invention onto a recording medium by using a inkjet process; and a step of applying a treatment liquid for the ink composition or the ink composition of the ink set of the present invention onto the recording medium. The method of forming an image according to the present invention may further include as elementary steps thereof the other steps.

In the present invention, a polymerizable compound that is capable of being polymerized and cured by an application of an actinic energy ray is included together with the pigment in the ink composition that forms an ink image, so that the image may be fixed by aggregation of the pigment when the ink composition contacts the treatment liquid and that the polymerizable compound is polymerized and cured while it is incorporated among pigment particles, whereby the strength of an image finally obtained may be enhanced.

Namely, the components in the ink composition are aggregated rapidly with the treatment liquid so as to prevent inks from being mixed with each other (ink bleeding or color mixing) and to allow high-speed recording. In addition, the polymerizable compound is appropriately incorporated among aggregated pigment particles while color and image writing property upon high-speed recording (reproducibility of fine lines and fine portions of images) are improved. The incorporated polymerizable compound is polymerized and cured so as to improve the strength of resulting images. In this way, high-speed recording adaptability and improvement of abrasion resistance may be attained at the same time.

In particular, the above advantages are more effectively exerted when an image is recorded on a coated paper where pigment is rendered to remain on the surface of the recording medium.

In the following, the steps of the inkjet recording method of the present invention are described.

Ink Applying Step

In the ink applying step, an ink composition containing a pigment, a polymerization initiator, water, and a water soluble polymerizable compound that causes polymerization when irradiated with an actinic energy radiation is applied onto a recording medium by an inkjet process. In this step, the ink composition can be applied selectively onto the recording medium, so that a desired visible image can be formed. The ink composition includes at least a pigment, polymer particles, and a water soluble polymerizable compound, and details of the ink composition, such as details and preferred modes of the respective components, are as described above.

Image forming utilizing the inkjet process can be performed, specifically, by supplying energy thereby ejecting an ink composition to a desired recording medium, that is, plain paper, resin-coated paper, paper used exclusively for inkjet recording described, for example, in JP-A Nos. 8-169172, 8-27693, 2-276670, 7-276789, 9-323475, 62-238783, 10-153989, 10-217473, 10-235995, 10-217597, and 10-337947, films, common use paper for electrophotography, clothes, glass, metals, ceramics, etc. As the inkjet recording method suitable to exemplary embodiments of the invention, a method described in JP-A No. 2003-306623, in columns (0093) to (0105) may be applicable.

The inkjet method is not particularly limited and may be of any known system, for example, a charge control system of ejecting an ink utilizing an electrostatic attraction force, a drop on demand system of utilizing a vibration pressure of a piezo element (pressure pulse system), an acoustic inkjet system of converting electric signals into acoustic beams, irradiating them to an ink, and ejecting the ink utilizing a radiation pressure, and a thermal inkjet system of heating an ink to form bubbles and utilizing the resultant pressure (BUBBLEJET (registered trade mark)). Examples of the inkjet method include a system of injecting a number of ink droplets of low concentration, a so-called "photo-ink" each in a small volume, a system of improving an image quality using plural inks of a substantially identical hue and of different concentrations, and a system of using a colorless transparent ink.

The inkjet head used in the inkjet method may be either an on-demand system or a continuous system. The ejection system includes, specifically, for example, an electric-mechanical conversion system (for example, single cavity type, double cavity type, bender type, piston type, share mode type, and shared wall type, etc.), an electric-thermal conversion system (for example, thermal inkjet type, BUBBLEJET (registered trade mark) type, etc.), an electrostatic attraction system (for example, electric field control type, and slit jet type, etc.), and an electric ejecting system (for example, spark jet type, etc.) and any of the ejection systems may be used.

Ink nozzles, etc. used for recording by the inkjet method are not particularly limited but can be selected properly depending on the purpose.

Specific examples of the inkjet method include those described below.

(1) A method called electrostatic attraction system, in which a strong electric field is applied between a nozzle and an accelerating electrode disposed in front of the nozzle so as to successively jet ink droplets from the nozzle, print information signals are supplied to deflection electrodes while the ink droplets pass a gap between the deflection electrodes so that the ink droplets are jetted towards a recording medium, and the ink is fixed on the recording medium to record an image, or in which ink droplets are jetted from a nozzle towards a recording medium, without being deflected, according to print information signals and an image is thereby fixed on the recording medium.

(2) A method in which a pressure is applied to an ink liquid by a small-sized pump and an inkjet nozzle is mechanically vibrated using a crystal oscillator or the like, thereby forcibly jetting ink droplets from the nozzle. The ink droplets jetted from the nozzle is electrically charged simultaneously with the jetting, and print information signals are supplied to deflection electrodes while the ink droplets pass a gap between the deflection electrodes so as to jet the ink droplets towards a recording medium, and an image is thereby recorded on the recording medium.

(3) A piezo method in which pressure and print information signal are simultaneously applied to an ink liquid by a piezoelectric device, so that ink droplets are jetted from a nozzle towards a recording medium and an image is thereby recorded on the recording medium.

(4) A BUBBLE-JET (registered trademark) method, in which an ink liquid is heated and bubbled by a microelectrode according to print signal information, and the bubbles are allowed to expand so that the ink liquid is jetted from a nozzle towards a recording medium and an image is thereby recorded on the image recording medium.

Examples of the inkjet head include an inkjet head of a shuttle system in which a short serial head is used and recording is performed while allowing the head to scan in the across-the width direction of a recording medium, and an inkjet head of a line system in which a line head in which recording elements are arranged corresponding to the entire region for one side of a recording medium is used. In the line system, an image can be recorded over the entire surface of the recording medium by allowing the recording medium to be scanned in the direction being perpendicular to the direction of aligning the recording elements, in which a transportation system such as a carriage by which the short head moves for scanning is not necessary. Further, since complicated scanning control for the movement of the carriage and the recording medium is not necessary and only the recording medium is moved, higher recording speed can be attained as compared with the shuttle system. While the image forming method in exemplary embodiments of the invention is applicable to any one of them, the effect of improving the ejection accuracy and the abrasion resistance of the image is generally remarkable when the inkjet recording method is applied to the line system without performing dummy jetting.

The amount of ink per one drop jetted from an inkjet head is preferably from 1 pL to 10 pL, and more preferably from 1.5 pL to 6 pL, from the viewpoint of obtaining a high-precision image. It is also effective to jet liquid droplets of different quantities in combination, with a view to suppressing unevenness in an image and improving smoothness in continuous gradation. The present invention is effective also in such an embodiment.

—Treatment Liquid Applying Step—

The treatment liquid applying step performs imaging by applying a treatment liquid containing a coagulant which coagulates components in the ink composition, to a recording medium, and placing the treatment liquid in contact with an ink composition. In this case, dispersed particles such as pigments and the like in the ink composition aggregate, and an image is fixed to the recording medium. While the treatment liquid contains at least one coagulant, the details and preferred embodiments of the respective components in the treatment liquid are as described previously.

Application of the treatment liquid may be performed by applying known methods such as a coating method, an inkjet method, and an immersion method. The coating method may be performed by a known coating method using a bar coater, an extrusion die coater, an air doctor coater, a blade coater, a rod coater, a knife coater, a squeeze coater, or a reverse roll coater. Details of the inkjet method are as described above.

The treatment liquid applying step may be provided before or after the ink applying step using the ink composition.

In the invention, an embodiment in which the ink applying step is provided after the treatment liquid is applied in a treatment liquid applying step, is preferable. Specifically, an embodiment in which, before applying the ink composition onto the recording medium, a treatment liquid for coagulating pigments and/or a self dispersing polymer in the ink composition is applied in advance, and the ink composition is applied so as to contact the treatment liquid applied on the recording medium to form an image, is preferable. Thereby, image recording may be speeded-up and, even when high speed recording is performed, an image having high density, and high resolution is obtained.

The amount of the treatment liquid to be applied is not particularly limited as long as the ink composition can be coagulated, and is preferably 0.1 g/m$^2$ or more in terms of the amount of applied coagulant. The amount of the applied coagulant is more preferably from 0.2 g/m$^2$ to 0.7 g/m$^2$. When the amount of the applied coagulant is 0.1 g/m$^2$ or more, superior high-speed coagulation properties that accord with various modes of the use of the inkjet composition are maintained. A coagulant application amount of 0.7 g/m$^2$ or less is preferable in that disadvantageous influences, such as change in gloss, are not given to the surface properties of the recording medium to which the treatment liquid is applied.

According to exemplary embodiments of the invention, it is preferable to provide an ink discharging step after the treatment liquid applying step, and to further provide a heating drying step of heating and drying the treatment liquid on the recording medium, between the time after applying the treatment liquid onto the recording medium, and the time until the ink composition is applied. By heating and drying the treatment liquid previously before the ink discharging step, ink coloring properties such as the prevention of bleeding becomes good, and visible images having good color density and hue can be recorded.

The heating and drying can be carried out by a known heating means such as heater, an air blowing means utilizing air blowing such as dryer, or a means combining these. Examples of the heating method include a method of supplying heat by a heater or the like, from the surface of the recording medium opposite the surface applied with the treatment liquid, a method of blowing a warm air or hot air to the surface of the recording medium applied with the treatment liquid, a method of heating using an infrared heater, or the like. Heating can also be performed by combining these methods.

Step of Irradiating Actinic Energy Ray

The method of forming an image according to the present invention includes as an elementary step thereof preferably a step of irradiating an actinic energy ray to the ink composition that is applied onto a recording medium. The polymerizable compound that is contained in the ink composition is polymerized by irradiating the actinic energy ray, so that a cured film that contains a colorant is formed. Whereby, the abrasion resistance and blocking resistance of the resulting image is effectively improved.

The ink composition that is applied onto a recording medium is cured by irradiating an actinic energy ray thereto. This is because the initiator contained in the ink composition in the present invention is decomposed by actinic energy ray irradiation and generates initiation species such as radicals, acids, or bases; and the initiation species initiate and promote the polymerization reaction of the polymerizable compound so as to cure the ink composition.

In addition to that, when the actinic energy ray is irradiated, the ink composition is further aggregated (fixed) by an action of an acid that is supplied from an acid generating agent contained in the treatment liquid, whereby image qualities (including abrasion resistance and blocking resistance) are improved.

Examples of the actinic energy ray used herein include: α rays; γ rays; electron beams; X-rays; ultraviolet rays; visible light; and infrared rays. The wavelength of the actinic energy ray is preferably from 200 nm to 600 nm, more preferably from 300 nm to 450 nm, and even more preferably from 350 nm to 420 nm, for example.

The power of the actinic energy ray is preferably 5,000 mJ/cm$^2$ or less, more preferably from 10 mJ/cm$^2$ to 4,000 mJ/cm$^2$, and even more preferably from 20 mJ/cm$^2$ to 3,000 mJ/cm$^2$.

As a source of the actinic energy ray, mainly a mercury lamp or a gas or solid-state laser is used. As a light source that is used to cure a UV-curable inkjet recording ink, a mercury lamp and a metal halide lamp are widely known. However, from the viewpoint of preserving environment, a device free from mercury is strongly demanded at present. Replacement to a GaN-based semiconductor UV light emitting device is quite advantageous industrially or environmentally. Further, an LED (UV-LDE) or an LD (UV-LD) is small in size and low-cost, having long operating life and high efficiency. They are expected to be a light source for an inkjet process of photo-cure type.

In addition, a light emitting diode (LED) or a laser diode (LD) may be also used as an actinic radiation ray (energy ray) source. In particular, when a UV light source is required, a UV-LED or a UV-LD may be used. For instance, a purple color LED with a main emission spectrum having wavelengths between 356 nm and 420 nm is available in the market from Nichia Corp.

A particularly preferable actinic energy ray source in the present invention is a UV-LED and most preferably a UV-LED having a peak wavelength between 350 nm and 430 nm.

Recording Medium

According to the inkjet recording method of the present invention, an image is recorded on a recording medium.

The recording medium is not particularly limited, and may be a cellulose-based general printing paper, such as high-quality paper, coat paper, or art paper, which is used for general offset printing and the like. When image recording is performed on the cellulose-based general printing paper by a general inkjet process using an aqueous ink, absorption and drying of the ink is relatively slow, colorant migration easily occurs after ink spotting, and image quality tends to lower. In contrast, according to the inkjet recording method of the present invention, a high-quality image recording having excellent color density and hue is achieved while suppressing the migration of the colorant.

As the recording medium, a recording medium which is generally commercially available may be used, and examples include high quality paper such as OK Prince High Quality (trade name, manufactured by Oji Paper Co., Ltd.), Shiraoi (trade name, manufactured by Nippon Paper Industries Co., Ltd.), and New NP High Quality (trade name, manufactured by Nippon Paper Industries Co., Ltd.), fine coated paper such as OK Ever Lite Coat (trade name, manufactured by Oji Paper Co., Ltd.) and Aurora S (trade name, Nippon Paper Industries Co., Ltd.), light coated paper (A3) such as OK Coat L (trade name, manufactured by Oji Paper Co., Ltd.) and Aurora L (trade name, manufactured by Nippon Paper Industries Co., Ltd.), coated paper (A2, B2) such as OK Top Coat+(trade name, manufactured by Oji Paper Co., Ltd.) and Aurora Coat (trade name, manufactured by Nippon Paper Industries Co., Ltd.), and an art paper (A1) such as OK Kanefuji+(trade name, manufactured by Oji Paper Co., Ltd.) and Tokubishi Art (trade name, manufactured by Nippon Paper Industries Co., Ltd.). Further, various papers for photography for use in image forming methods may be used.

Among the recording media, a so-called coated paper used in general offset printing is preferred. The coated paper is a product obtained by coating with a coating material the surface of a paper such as a high quality paper or neutral paper which is mainly based on cellulose and is not surface treated. The coated paper is likely to cause problems in product quality such as the gloss or abrasion resistance of images, in the conventional image formation by aqueous inkjet recording, but in the image forming method in exemplary embodiments of the invention, gloss irregularity is suppressed, and images having good glossiness and abrasion resistance are obtained. Particularly, it is preferable to use a coated paper having a base paper and a coating layer containing inorganic pigments, and more preferable to use a coated paper having a base paper and a coating layer containing kaolin and/or calcium bicarbonate. More specifically, art paper, coated paper, lightweight coated paper or finely coated paper is more preferred.

Inkjet Recording Apparatus

Next, an example of an inkjet recording apparatus favorably used for the inkjet process in the image recording method in the present invention will be explained in detail with reference to FIG. 1. FIG. 1 is a schematic view showing an example of a structure of the entire inkjet recording apparatus.

As shown in FIG. 1, the inkjet recording apparatus includes: treatment liquid application unit 12, having treatment liquid jetting head 12S that jets the treatment liquid; treatment liquid drying zone 13, having heating unit (not shown) that dries the applied treatment liquid; and ink jetting unit 14 that jets various ink compositions; and ink drying zone 15 at which the jetted ink composition is dried, in this order in the conveyance direction of the recording medium (the direction of the arrow shown in the FIGURE). Further, UV ray irradiation unit 16, having UV ray irradiation lamp 16S, is provided downstream of ink drying zone 15 in the conveyance direction of the recording medium.

The recording medium that has been supplied to the inkjet recording apparatus is conveyed by conveyance rollers (conveyer rollers) from a feed section (paper supply unit) to treatment liquid application unit 12, then to treatment liquid drying zone 13, then to ink jetting unit 14, then to ink drying zone 15, and then to UV ray irradiation unit 16, and then accumulated in an accumulation section (storage unit). The feed section feeds sheets of the recording medium from a case in which the sheets are loaded. The conveyance of the recording medium may be conducted by a method other than the method using conveyance rollers, and examples thereof include a drum conveyance method using a drum-shaped member, a belt conveyance method, or a stage conveyance method using a stage.

Among the plural conveyance rollers provided in the inkjet recording apparatus, at least one roller may be a drive roller to which the force generated by a motor (not shown) is transmitted. By rotating the drive roller at a constant rate using the motor, the recording medium is conveyed in a predetermined direction at a predetermined conveyance amount.

Treatment liquid application unit 12 has treatment liquid jetting head 12S, which is connected to a storage tank in which the treatment liquid is stored. Treatment liquid jetting head 12S jets the treatment liquid from jetting nozzles disposed to face the recording surface of the recording medium so that droplets of the treatment liquid can be applied onto the recording medium. The method used in treatment liquid application unit 12 is not limited to a method of jetting from a head in the form of a nozzle, and may be a coating method using a coating roller. According to the coating method, the treatment liquid may be readily applied to almost the entire one surface of the recording medium, including an image portion on which ink droplets are to be spotted by ink jetting unit 14 provided at the downstream side. In order to make uniform the thickness of the treatment liquid applied onto the recording medium, an air-knife may be used, or a method of providing a member having an acute angle to give a gap between the member and the recording medium that corresponds to the predetermined amount of treatment liquid.

Treatment liquid drying zone 13 is positioned downstream of treatment liquid application unit 12 in the conveyance direction of the recording medium. Treatment liquid drying zone 13 may include: a known heating means such as a heater; an air blower such as a drier; or a combination thereof. The heating may be conducted by a method of disposing a heat-generating member, such as a heater, at a side of the recording medium opposite to the surface applied with treatment liquid wherein, if the recording medium is conveyed automatically, the heat-generating member may be positioned, for example, below the conveyance system that conveys the recording medium placed thereon; or by a method of blowing warm or hot air onto the surface of the recording medium applied with treatment liquid; or by a method of using an infrared heater. Any of these methods may be used singly, or in combination of two or more thereof.

Since the surface temperature of the recording medium may vary depending on the type (material, thickness and the like) of the recording medium and the environmental temperature, it is preferable to form the treatment liquid layer while regulating the surface temperature by using a system including a measurement section that measures the surface temperature of the recording medium and a control section that provides the heating control unit with feedback on the temperature measured by the measurement section. The measurement section for measuring the surface temperature of the recording medium is preferably a contact-type or non-contact type thermometer.

The solvent may be removed using, for example, a solvent-removing roller. Alternatively, a method in which excess solvent is removed from the recording medium by an air knife is also applicable.

Ink jetting unit 14 is positioned downstream of treatment liquid drying zone 13 with respect to the conveyance direction of the recording medium. Ink jetting unit 14 includes recording heads (ink jetting heads) 30K, 30C, 30M and 30Y, which are connected to ink reservoirs that store inks of black (K), cyan (C), magenta (M) and yellow (Y), respectively. Each ink reservoir (not shown) stores an ink composition containing a pigment of a corresponding color, resin particles, water soluble organic solvent and water, and supplies the ink to the corresponding head among ink jetting heads 30K, 30C, 30M and 30Y, as necessary, when image recording is performed. Further, as shown in FIG. 1, recording heads 30A and 30B for jetting inks of specific colors may be further provided, which are positioned downstream of ink jetting heads 30K, 30C, 30M and 30Y with respect to the conveyance direction of the recording medium, such that recording heads 30A and 30B jet the inks having specific colors as necessary.

Ink jetting heads 30K, 30C, 30M and 30Y jet inks in a manner corresponding to the image to be formed, through jetting nozzles that are positioned so as to face the recording surface of the recording medium. In this way, inks of the respective colors are applied to the recording surface of the recording medium to form a color image.

Treatment liquid jetting head 12S and ink jetting heads 30K, 30C, 30M, 30Y, 30A and 30B are each in the form of full-line head in which a number of jetting ports (nozzles) are aligned along the maximum recording width of the image to be formed on the recording medium. In this form, image recording on a recording medium can be carried out at higher speed compared to serial-type recording in which recording is carried out using a short-length shuttle head that reciprocates in the width direction of the recording medium (in a direction on the plane of the recording medium that is perpendicular to the conveyance direction of the recording medium) in a scanning manner. In the present invention, either of the above serial-type recording method or a recording method capable of recording at relatively high speed, such as a single-path system in which an image is formed in one scanning-movement by jetting using a line head while moving the recording medium relative to the line head in the fast scanning direction, may be employed. In the image recording method of the present invention, a high-quality image having high reproducibility may be obtained even in the single-path system.

In the FIGURE, treatment liquid jetting head 12S and ink jetting heads 30K, 30C, 30M, 30Y, 30A and 30B have the same structure.

The application amount of the treatment liquid and the application amount of the ink composition are preferably regulated in accordance with the necessity. For example, the amount of the treatment liquid may be changed according to the type of the recording medium, in order to, for example, adjust the properties such as viscoelasticity of the aggregates formed upon mixing of the treatment liquid and the ink composition.

Ink drying zone 15 is positioned downstream of ink jetting unit 14 in the conveyance direction of the recording medium. Ink drying zone 15 may have a structure similar to that of treatment liquid drying zone 13.

UV ray irradiation unit 16 is disposed further downstream of ink drying zone 15 in the conveyance direction of the recording medium, and emits UV rays from UV ray irradiation lamp 16S provided in UV ray irradiation unit 16, thereby curing through polymerization of the monomer components contained in an image after drying of the image. UV ray irradiation lamp 16S is a lamp which is disposed to oppose the recording surface of the recording medium, and with which the entire recording surface is irradiated to cure the entire image. The lamp used in UV ray irradiation unit 16 is not limited to UV ray irradiation lamp 16S, and it is also possible to use a halogen lamp, a high-pressure mercury lamp, a laser, a LED, an electron-beam irradiation device, or the like.

The UV ray irradiation unit 16 may be disposed before or after the ink drying zone 15.

The inkjet recording apparatus may further include a heating unit at the conveyance path from the feed section to the accumulation section, in order to conduct a heat treatment on the recording medium. For example, by providing a heating unit at a desired position, such as upstream of treatment liquid drying zone 13 or between ink jetting unit 14 and ink drying zone 15, the temperature of the recording medium can be increased to a desired temperature, at which drying and fixing is performed effectively.

EXAMPLES

Hereinafter, the present invention will be specifically described with reference to Examples, but the present invention is not limited to these Examples, as long as not to be exceeded the gist of the present invention. Unless stated otherwise, the "parts" and "%" are based on mass.

Synthesis Examples

Synthesis of Water Soluble Resin Dispersant P-1

Synthesis was performed as follows.

A composition of supplying monomers was prepared by mixing methacrylic acid (236 parts), methyl methacrylate (414 parts), 2-ethylhexyl methacrylate (350 parts), and isopropanol (375 parts). A composition of supplying initiators was prepared by mixing 2,2-azobis(2-methyl butyronitrile) (22.05 parts) and isopropanol (187.5 parts).

Into isopropanol (187.5 parts) heated at 80° C. in a nitrogen atmosphere, a mixture of the composition of supplying monomers and the composition of supplying initiators was dropped over 2 hours. After dropping, the resulting reaction mixture was kept at 80° C. for 4 hours, and then cooled to 25° C. The solvent was removed under vacuum, so that a water soluble resin dispersant P-1 (water soluble dispersant) with a weight average molecular weight of 30,000 and an acid value of 154 mgKOH/g was obtained.

The other water soluble resin dispersants of the present invention may be synthesized in a substantially similar manner.

Preparation of Pigment Dispersion

The above obtained water soluble resin dispersant P-1 in an amount of 150 parts was dissolved in water and neutralized at pH 9 with a potassium hydroxide aqueous solution, so that an aqueous solution dissolving about 25% of the water soluble resin dispersant was prepared.

To 180 parts of the resulting aqueous solution of the water soluble resin dispersant, 90 parts of Pigment Blue 15:3 ("PHTHALOCYANINE BLUE A220" (trade name) manufactured by Dainichiseika Color & Chemicals Mfg. Co., Ltd.) and 330 parts of water were admixed. The resulting mixture was dispersed with a beads mill (0.1 mm of bead diameter, zirconia beads) for 4 hours to obtain a dispersion N (non-crosslinked dispersion) of non-crosslinked pigment-containing resin particles with a pigment concentration of 15%.

To 136 parts of the above dispersion N, 0.23 part of polyethylene glycol diglycidyl ether (Aldrich Catalogue No. 47,569-6) was added. The resulting mixture was reacted at 50° C. for 6.5 hours and then cooled to 25° C., so that a dispersion 1 (crosslinked dispersion) of crosslinked pigment-containing rein particles with a pigment concentration of 15% was obtained.

Example 1

Preparation of Ink Set 1

An ink set 1 with a combination of the following ink composition A1 and treatment liquid B1 was prepared.
Preparation of Ink Composition A1
Including the dispersion of the crosslinked pigment-containing resin particles obtained above, the components described in the following prescription were mixed and passed through a 5 μm membrane filter to prepare an ink composition A1.
Prescription of Ink Composition A1
Dispersion 1 of the above crosslinked pigment-containing resin particles (solid content of pigments: 15%): 26.8 parts,
Nonionic compound 2 (polymerizable compound): 19 parts,
"OLFIN E1010" (trade name; manufactured by Nisshin Chemical Industry Co., Ltd., surfactant): 1 part,
"IRGACURE 2959" (trade name; manufactured by Ciba Japan Co., Ltd., photo-polymerization initiator): 2.9 part, and
Ion exchanged water: remaining amount that provides a total amount of 100 parts.
Nonionic Compound 2

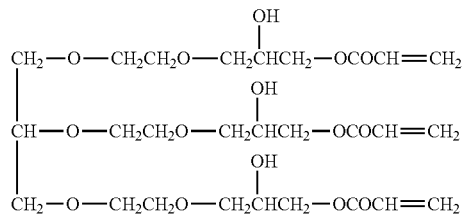

(Preparation of Treatment Liquid B1)
The components of the following composition were mixed to prepare Treatment liquid B1. The viscosity, surface tension and pH (25° C.±1° C.) of Treatment liquid B1 were 2.5 mPa·s, 40 mN/m, and 1.0, respectively.
<Composition of Treatment Liquid B1>

| | |
|---|---|
| Malonic acid (manufactured by Wako Pure Chemical Industries Ltd.) | 25% |
| Diethylene glycol monomethyl ether (manufactured by Wako Pure Chemical Industries Ltd.) | 20.0% |
| EMULGEN P109 (trade name, manufactured by Kao Corporation, nonionic surfactant) | 1.0% |
| Ion-exchanged water | quantity up to 100%. |

Examples 2 to 7

Ink sets 2 to 7 were each independently prepared in a manner substantially similar to that in Example 1 except that the following polymerizable compounds 1 to 6 were respectively used in preparation of ink compositions A2 to A7 instead of nonionic compound 2 used in the preparation of the ink composition A1 in Example 1, as listed in Table 1 below.

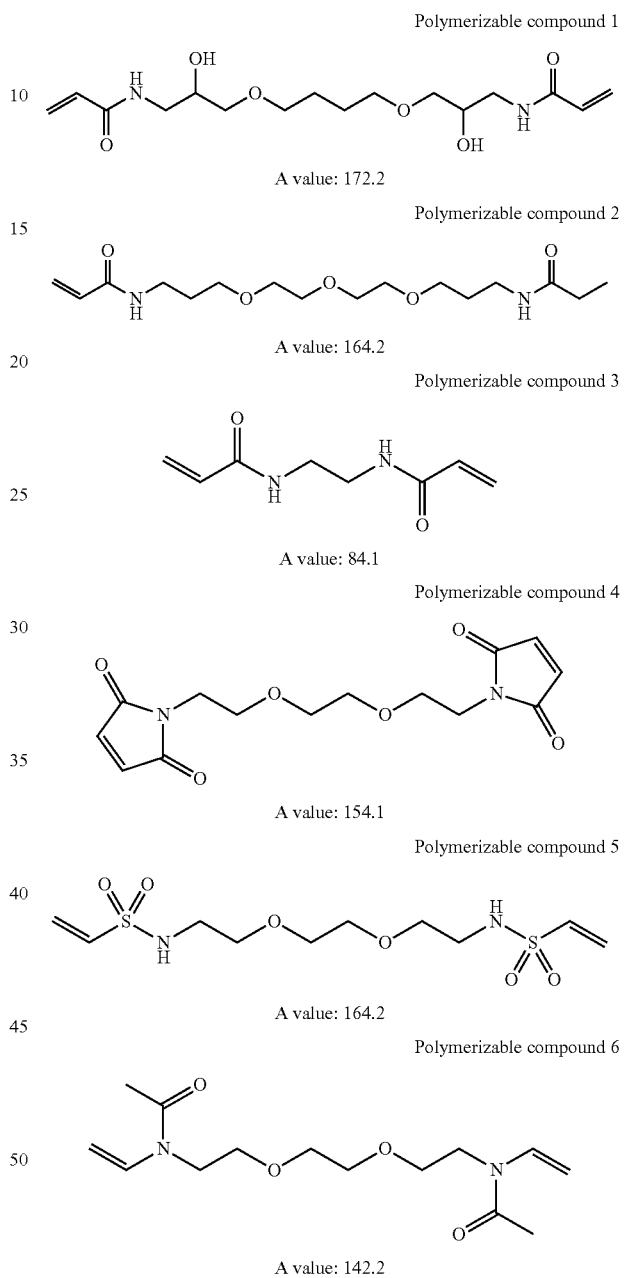

Comparative Example 1

An ink set of Comparative Example 1 was prepared in a manner substantially similar to that in Example 1 except that a dispersion N of non-crosslinked polymer particles containing pigments was used in preparation of ink composition A8 instead of the dispersion 1 of crosslinked polymer particles containing pigments used in the preparation of the ink composition A1 in Example 1.

Comparative Example 2

An ink composition A9 of Comparative Example 2 was prepared in a manner substantially similar to that in Comparative Example 1 except that the polymerizable compound 1 was used in preparation of ink composition A9 instead of the nonionic compound 2 used in the preparation of the ink composition A8 in Comparative Example 1.

[Evaluation]

<Image Forming Method>

First, an inkjet apparatus was prepared which has, as shown in FIG. 1, treatment liquid application unit 12 equipped with treatment liquid jetting head 12S that jets a treatment liquid, treatment liquid drying zone 13 that dries the applied treatment liquid, ink jetting unit 14 that jets various aqueous inks, ink drying zone 15 that dries the applied aqueous ink, and UV ray irradiation unit 16 equipped with UV ray irradiation lamp 16S capable of irradiating UV rays are provided sequentially in the conveyance direction of the recording medium (the direction of the arrow shown in the FIGURE).

Although not shown in the FIGURE, treatment liquid drying zone 13 has an air blower at the recording surface side of the recording medium that supplies dry air so as to dry the treatment liquid, and an infrared heater at the non-recording surface of the recording medium. Treatment liquid drying zone 13 is configured such that at least 70% by mass of the water contained in the treatment liquid is evaporated (dried) off during a period until 900 msec has passed after the application of the treatment liquid is started at the treatment liquid application unit, by regulating the temperature and air volume. In ink jetting unit 14, black-ink jetting head 30K, cyan-ink jetting head 30C, magenta-ink jetting head 30M, and yellow-ink jetting head 30Y are disposed in this order in the conveyance direction (the direction of the arrow). Each of the heads is a 1200 dpi/10 inch-wide full-line head having a driving frequency of 25 kHz and a recording medium conveyance velocity of 530 mm/sec. The respective heads are configured to jet inks of respective colors in a single-pass manner while moving in the principal scanning direction relative to the recording medium.

The treatment liquid and ink prepared above were charged into storage tanks (not shown in the FIGURE) respectively connected to treatment jetting head 12S and each color ink jetting heads 30C, 30M and 30Y of the inkjet apparatus that was configured as shown in FIG. 1, and a solid image and a 1200 dpi line image were recorded on sheets of a recording medium. The amount of the aqueous treatment liquid applied to each sheet of the recording medium was set to be 5 ml/m$^2$. As the recording medium, U LITE (having a basis weight of 84.9 g/m$^2$, (trade name, manufactured by Nippon Paper Industries Co. Ltd.) was used.

As the image recording, under the conditions of an ink amount per droplet of 2.8 pL, a driving frequency of 25.5 kHz, and a resolution of 1200 dpi×1200 dpi, a solid image was formed by jetting of the treatment liquid and the each color inks by the line system onto the entire one surface of the sample of a sheet of the recording medium cut into an A5-size.

When the images were recorded, the treatment liquid was jetted from treatment liquid jetting head 12S onto the recording medium in a single-pass manner, and then the treatment liquid was dried in treatment liquid drying zone 13. Conveyance of the recording medium was controlled so as to pass through the treatment liquid drying zone within 900 m sec after the initiation of the jetting of the treatment liquid. In treatment liquid drying zone 13, while the spotted treatment liquid was heated with an infrared heater from the side (back side) of the recording medium that was opposite to the surface at which the treatment liquid was spotted such that a film surface temperature was maintained at 40 to 45° C., hot air having a temperature of 120° C. was blown from a blower to the recording surface, and the air volume was changed to achieve a desired drying amount. Subsequently, the cyan ink was jetted from cyan ink jetting head 30C to record an image. Then, in a manner similar to the above, drying of the ink was performed in ink drying zone 15 by blowing a hot air having a temperature of 120° C. and a velocity of 5 m/sec from a blower to the recording surface for 15 seconds while heating with an infrared heater from the side (back side) of the recording medium that was opposite to the surface at which the ink was spotted. After the drying of the image, the image was irradiated with UV rays (a metal halide lamp, manufactured by EYE GRAPHICS CO. LTD., a maximum irradiation wave length 365 nm) so as that an integrated irradiance level become 3 J/cm$^2$ in UV ray irradiation unit 16, whereby the image was cured.

White Spot Evaluation

The treatment liquid and water-borne ink composition of the above ink set were ejected for 30 minutes. After 10 second pressurization at 15 kPa, wiping with a "CLEAN WIPER FF-390C" (manufactured by Kuraray Corp.) was performed as a maintenance job. After that, ejection still continued for 5 minutes. After 5 minutes elapsed, the recorded solid image was cut in a size of 8 cm×8 cm and observed. The image observed was subjected to a visual evaluation in accordance with the following criteria.

Evaluation Criteria

A: No white spots were observed,
B: White spots were observed at 1 or 2 positions,
C: White spots were observed at 3 to 10 positions, and
D: White spots were observed at more than 10 positions.

Ejection Reliability Evaluation

A printer head of "GELJET GX5000" (manufactured by Ricoh Company) was fixed as: a line head direction (a principal scanning direction) along which ink nozzles were arrayed pointed to a direction perpendicular to a moving direction (a sub scanning direction) of a stage that was designed to be movable in a given straight line direction at a speed of 500 mm/second.

Then, an ink storage tank connected to the printer head was refilled with the above prepared ink composition that was aged for 2 weeks at 40° C. after preparation. A photo quality paper "PRO" (manufactured by FUJIFILM Corp.) serving as a recording medium was attached to the stage that moved in a direction (a sub scanning direction) perpendicular to the direction (a principal scanning direction) along which the ink nozzles of the printer head were arrayed.

After that, the stage was moved in a running direction (sub scanning direction) at a speed of 508 mm/second. While only one array of nozzles (192 nozzles, 150 dpi) among the two arrays of nozzles was used, through only continuous 10 nozzles among the 192 nozzles, 400 shots were dropped at 150 dpi in a stage running direction, and then 1000 shots were dropped in the running direction from the 192 nozzles at 1,200 dpi, so that an initial image was printed. The amount of the ink drop was 3.4 pL and the ink-ejection frequency was 24 kHz.

Immediately after the initial image was printed, the stage was restored to the initial position. One minute later after the last dot (shot) of the initial image was ejected (dropped), through 10 nozzles that were arrayed adjacent to the continuous 10 nozzles, 400 shots were dropped at 150 dpi in the stage running direction, so that an image after one minute elapsed was printed.

With reference to the firstly dropped 10 dots of the initial image, the firstly dropped 10 dots of the image after one minute elapsed were observed through a microscope with a magnification of 50 times, and evaluated in accordance with the following criteria.

Evaluation Criteria

A: The dots of the image after one minute elapsed show no parallel deviation in the running direction with respect to the dots of the initial image, B: The dots of the image after one minute elapsed show less than 30 μm parallel deviation in the running direction with respect to the dots of the initial image, and C: The dots of the image after one minute elapsed show 30 μm or more parallel deviation in the running direction with respect to the dots of the initial image, or the first dot of the image after one minute elapsed is not ejected.

TABLE 1

| | | Ink | | | | | | Evaluation | |
|---|---|---|---|---|---|---|---|---|---|
| | | | | | Photo- | | | | |
| | | Pigment | Crosslinking | Polymerizable | Polymeriza- | Treatment liquid | | White | Ejection |
| | Kind | dispersion | agent | compound | tion initiator | Kind | Coagulant | spot | reliability |
| Example 1 | A1 | CL-disp'n | PEG diglycidyl ether | Nonionic compound 2 | IRG 2959 | B1 | Malonic acid | B | B |
| Example 2 | A2 | CL-disp'n | PEG diglycidyl ether | Polymerizable compound 1 | IRG 2959 | B1 | Malonic acid | A | A |
| Example 3 | A3 | CL-disp'n | PEG diglycidyl ether | Polymerizable compound 2 | IRG 2959 | B1 | Malonic acid | A | A |
| Example 4 | A4 | CL-disp'n | PEG diglycidyl ether | Polymerizable compound 3 | IRG 2959 | Bl | Malonic acid | A | B |
| Example 5 | A5 | CL-disp'n | PEG diglycidyl ether | Polymerizable compound 4 | IRG 2959 | B1 | Malonic acid | A | B |
| Example 6 | A6 | CL-disp'n | PEG diglycidyl ether | Polymerizable compound 5 | IRG 2959 | B1 | Malonic acid | A | B |
| Example 7 | A7 | CL-disp'n | PEG diglycidyl ether | Polymerizable compound 6 | IRG 2959 | B1 | Malonic acid | A | A |
| Comparative Example 1 | A8 | non CL-disp'n | non | Nonionic compound 2 | IRG 2959 | B1 | Malonic acid | D | C |
| Comparative Example 2 | A9 | non CL-disp'n | non | Polymerizable compound 1 | IRG 2959 | B1 | Malonic acid | C | C |

In table 1, the abbreviation "CL-disp'n" denotes "crosslinked dispersion", the abbreviation "non CL-disp'n" denotes "non crosslinked dispersion", the abbreviation "PEG" denotes "polyethylene glycol", and the abbreviation "IRG" denotes "Irgacure (trade name)".

According to the present invention, an ink composition that includes as components thereof a polymerizable compound and a pigment dispersion and has an excellent ink-ejection stability over a long time is provided.

Further, according to the present invention, an ink set that is capable of forming an image free of defects such as white spots and a method of forming an image are provided.

The foregoing description of the exemplary embodiments of the present invention has been provided for the purposes of illustration and description. It is not intended to be exhaustive or to limit the invention to the precise forms disclosed. The embodiments were chosen and described in order to best explain the principles of the invention and its practical applications, thereby enabling others skilled in the art to understand the invention for various embodiments and with the various modifications as are suited to the particular use contemplated.

All publications, patent applications, and technical standards mentioned in this specification are herein incorporated by reference to the same extent as if such individual publication, patent application, or technical standard was specifically and individually indicated to be incorporated by reference. It will be obvious to those having skill in the art that many changes may be made in the above-described details of the preferred embodiments of the present invention. It is intended that the scope of the invention be defined by the following claims and their equivalents.

What is claimed is:

1. An inkjet ink composition comprising: a pigment coated with a dispersant polymer; a water soluble polymerizable compound; a polymerization initiator; and water, the dispersant polymer being formed from a water soluble dispersant by crosslinking with a crosslinking agent,
    wherein the water soluble polymerizable compound comprises at least two polymerizable functional groups selected from the group consisting of a (meth)acrylamido group, a maleamido group, a vinylsulfono group and a N-vinylamido group, and has a ratio of a molecular weight of the water soluble polymerizable compound to a number of the polymerizable functional groups in a molecule (molecular weight/number of the polymerizable functional groups) of 175 or less.

2. The inkjet ink composition according to claim 1, wherein the polymerization initiator is a photopolymerization initiator.

3. The inkjet ink composition according to claim 1, wherein the water soluble dispersant comprises a carboxylic group.

4. The inkjet ink composition according to claim 1, wherein an acid value of the water soluble dispersant is in a range from 135 mgKOH/g to 200 mgKOH/g.

5. The inkjet ink composition according to claim 1, wherein at least one of the polymerizable functional groups is a (meth)acrylamido group.

6. The inkjet ink composition according to claim 1, wherein the water soluble polymerizable compound comprises at least two (meth)acrylamido groups and at least one nonionic hydrophilic group selected from the group consisting of an oxyalkylene group, an oligomer of the oxyalkylene group and a hydroxyl group, and the ratio of the molecular weight to the polymerizable functional groups is from 84 to 165.

7. The inkjet ink composition according to claim 1, wherein an amount of the water soluble dispersant is in a range from 10% by mass to 200% by mass with respect to a total mass of the pigment.

8. The inkjet ink composition according to claim 1, wherein the crosslinking agent comprises a compound having two or more epoxy groups.

9. An ink set comprising:
the ink composition according to claim 1; and
treatment liquid comprising a coagulant that is adapted to coagulate at least a part of the components in the ink composition.

10. The ink set according to claim 9, wherein the coagulant comprises at least one selected from the group consisting of an acidic compound, a polyvalent metal salt, and a cationic polymer.

11. The ink set according to claim 9, wherein the coagulant comprises a dibasic or higher-basic water soluble organic acid.

12. The ink set according to claim 9, wherein a pH (at 25° C.) of the ink composition is 8 or higher, and a pH (at 25° C.) of the treatment liquid is in a range from 0.5 to 4.

13. An image forming method comprising:
imparting the inkjet ink composition in the ink set according to claim 9 onto a recording medium by an inkjet process, and
imparting the treatment liquid in the ink set onto a recording medium,
thereby forming an image.

14. A method of producing an ink composition, comprising:
preparing a pigment dispersion by dispersing a pigment with a water soluble dispersant;
crosslinking the water soluble dispersant with a crosslinking agent after preparing the pigment dispersion so as to coat the surface of the pigment with a resulting crosslinked dispersing polymer; and
preparing an ink composition through mixing the pigment dispersion, a water soluble polymerizable compound, a polymerization initiator, and water,
wherein the water soluble polymerizable compound comprises at least two polymerizable functional groups selected from the group consisting of a (meth)acrylamido group, a maleamido group, a vinylsulfono group and a N-vinylamido group, and has a ratio of a molecular weight of the water soluble polymerizable compound to a number of the polymerizable functional groups in a molecule (molecular weight/number of the polymerizable functional groups) of 175 or less.

* * * * *